(12) United States Patent
Sakamoto et al.

(10) Patent No.: US 7,779,532 B2
(45) Date of Patent: Aug. 24, 2010

(54) MANUFACTURING METHOD OF HYBRID PERMANENT MAGNET TYPE ELECTRIC ROTATING MACHINE

(75) Inventors: Masafumi Sakamoto, Kiryu (JP); Toru Kobayashi, Kiryu (JP); Masahiko Azegami, Kiryu (JP); Yasuaki Motegi, Kiryu (JP); Takaya Kato, Kiryu (JP); Shoji Oiwa, Kiryu (JP); Yasuo Matsuda, Kiryu (JP); Kazuo Onishi, Kiryu (JP); Tadashi Fukushima, Kiryu (JP); Norimoto Tanaka, Kiryu (JP)

(73) Assignee: Nidec Servo Corporation, Kiryu-shi (JP)

( * ) Notice: Subject to any disclaimer, the term of this patent is extended or adjusted under 35 U.S.C. 154(b) by 506 days.

(21) Appl. No.: 11/677,886

(22) Filed: Feb. 22, 2007

(65) Prior Publication Data
US 2007/0200464 A1 Aug. 30, 2007

(30) Foreign Application Priority Data
Feb. 28, 2006 (JP) .............................. 2006-052907
Sep. 29, 2006 (JP) .............................. 2006-266227

(51) Int. Cl.
*H02K 15/00* (2006.01)
(52) U.S. Cl. .......................... 29/596; 29/598; 310/49.36
(58) Field of Classification Search ........... 29/596–598, 29/732, 738; 310/49 R, 216, 254, 261, 156.47, 310/49.36, 156.64; 148/100, 302
See application file for complete search history.

(56) References Cited

U.S. PATENT DOCUMENTS

| 3,206,623 | A | 9/1965 | Snowdon | |
|---|---|---|---|---|
| 4,983,867 | A | 1/1991 | Sakamoto | |
| 5,289,064 | A | * 2/1994 | Sakamoto | 310/49 R |
| 5,410,200 | A | * 4/1995 | Sakamoto et al. | 310/49 R |
| 6,674,187 | B2 | * 1/2004 | Isozaki et al. | 310/49 R |
| 6,707,178 | B2 | * 3/2004 | Sakamoto et al. | 310/49 R |

(Continued)

FOREIGN PATENT DOCUMENTS

EP 1 303 030 A2 4/2003

(Continued)

OTHER PUBLICATIONS

U.S. Appl. No. 11/562,692, filed Nov. 22, 2006, Oiwa et al.

*Primary Examiner*—Minh Trinh
(74) *Attorney, Agent, or Firm*—Oblon, Spivak, McClelland, Maier & Neustadt, L.L.P.

(57) ABSTRACT

A manufacturing method of a hybrid permanent magnet type electric rotating machine including a stator that is constructed by winding excitation coils around respective main poles. A rotor is constructed by fixing a first rotor unit, which consists of a pair of rotor cores and a magnetic material sandwiched between the rotor cores, and a second rotor unit, which has the same construction as the first rotor unit, to a rotation shaft. The rotor is assembled to the stator to form an assembled body. The magnet material of the first rotor unit is magnetized in the axial direction by a magnetizing flux passing through a half of the assembled body in the axial direction. The magnet material of the second rotor unit is magnetized in the axial direction in an opposite polarity by a magnetizing flux passing through the remaining half of the assembled body in the axial direction.

8 Claims, 15 Drawing Sheets

U.S. PATENT DOCUMENTS

| | | | |
|---|---|---|---|
| 6,781,260 B2 * | 8/2004 | Sakamoto | 310/49 R |
| 6,867,525 B2 * | 3/2005 | Ionel et al. | 310/156.47 |
| 7,098,567 B2 * | 8/2006 | Ionel et al. | 310/216 |
| 7,145,278 B2 * | 12/2006 | Sakamoto | 310/156.64 |
| 2006/0071562 A1 | 6/2006 | Sakamoto et al. | |
| 2007/0200464 A1 * | 8/2007 | Sakamoto et al. | 310/49 R |

FOREIGN PATENT DOCUMENTS

| | | |
|---|---|---|
| JP | 3-195343 | 8/1991 |
| JP | 3-195344 | 8/1991 |

* cited by examiner

MANUFACTURING METHOD OF HYBRID PERMANENT MAGNET TYPE ELECTRIC ROTATING MACHINE

BACKGROUND OF THE INVENTION

The present invention relates to a hybrid (hereafter abbreviated as HB) permanent magnet type electric rotating machine used for OA equipment treating images, such as a facsimile, an ink-jet printer, a laser beam printer, or a copy machine. The present invention also relates to a manufacturing method of such an electric rotating machine.

Figure 14:
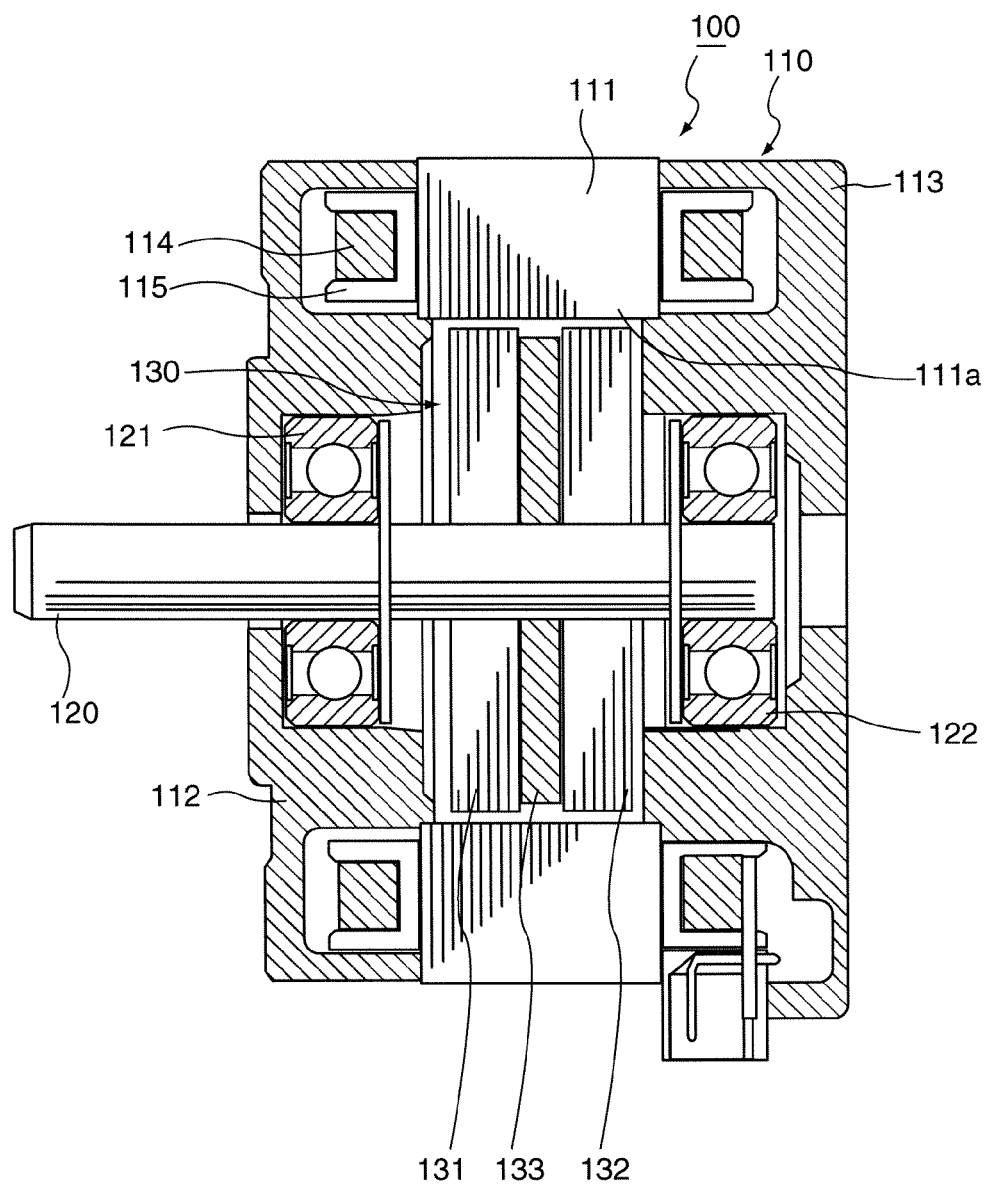
Figure 15:
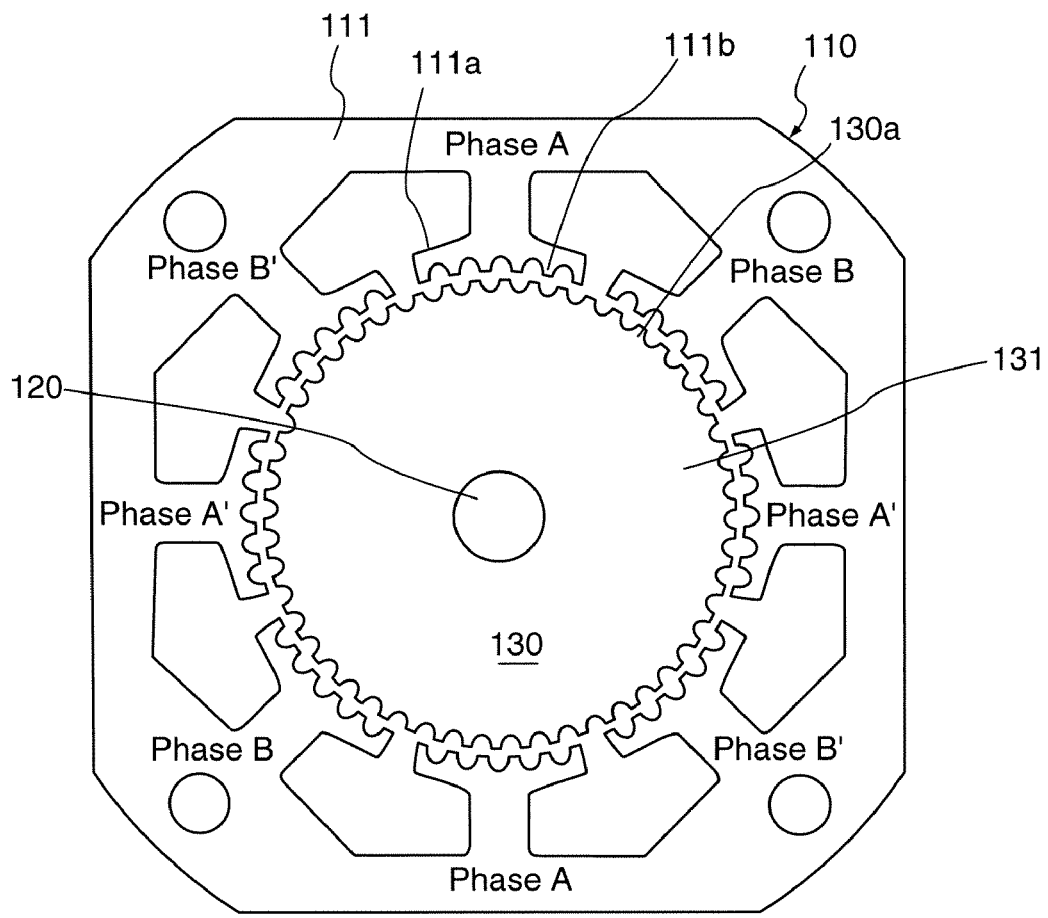

FIG. 14 and FIG. 15 show a conventional two-phase HB type stepping motor. FIG. 14 is a longitudinal sectional view and FIG. 15 is a front view showing a relation between a rotor core and a stator core. This stepping motor 100 is provided with a stator 110 having a stator core 111 of two-phase and eight-pole, and a rotor 130 fixed to a rotation shaft 120 that is rotatably supported inside the stator 110. The stator 110 is constructed by sandwiching a stator core 111, which is formed by stacking silicon steel plates, by a pair of brackets 112 and 113 formed from nonmagnetic material from the both sides in the axial direction. An excitation winding 114 wound around a bobbin 115 is attached to each main pole 111a formed on the stator core 111. As shown in FIG. 15, the stator core 111 includes the eight main poles that are radially formed to be directed to the center of the stator core 111. A plurality of inductors 111b are formed on the tip portion of each main pole 111a.

The rotor 130 is constructed by sandwiching a disc-like permanent magnet 133, which is magnetized in the axial direction, by a pair of rotor cores 131 and 132. As shown in FIG. 15, many small teeth 130a are formed around one rotor core 131. The same number of small teeth are formed around the other rotor core 132. The rotor cores 131 and 132 are fixed to the rotation shaft 120 so that they are deviated by ½ pitch of the small teeth. References 121 and 122 denote bearings.

As shown by a phase A, a phase B, a phase A', and a phase B' in FIG. 15, the excitation coils of one phase are wound around every other four main poles of the eight main poles 111a of the stator core 111. In this case, since the main poles located at the opposite positions at 180 degrees are excited in the same polarity when the excitation current is applied, the attraction forces in the radial direction are always canceled, the torque component in the tangential direction of the outer circumference of the rotor appears.

However, in the above-mentioned conventional structure (a full-main-pole structure), the stator has many main poles, and the manufacturing cost becomes high. In a reduced-main-pole structure (a half-main-pole structure) in which a stator has four main poles, the rotor core 132 is pulled in the lower direction as S polarity, when the rotor core 131 is pulled in the upper direction as N polarity, for example. This generates an unbalanced electromagnetic force due to the attraction forces in the radial direction (couple of forces due to so-called side pull), which generates vibration and noise, and deteriorates positioning accuracy.

On the other hand, U.S. Pat. No. 6,781,260 discloses a stepping motor of the reduced-main-pole structure (the half-main-pole structure) that has four main poles with large torque and low vibration. The stepping motor disclosed in the publication is constructed by arranging a rotor having two sets of rotor units inside a stator on which coils are wound. Each of the rotor units consists of a ring-shaped unipolar permanent magnet whose flat surfaces are magnetized and a pair of rotor cores that sandwich the permanent magnet. Many small teeth are formed around each of the rotor cores. The two rotor units are attached to a motor shaft so that the magnets have opposite polarities to make the magnetic polarities of the rotor teeth of the adjacent two rotor cores identical. Since the stepping motor of the publication is provided with four rotor cores, the radial attraction forces are distributed and balanced as compared with a conventional motor with two rotor cores. Therefore, an unbalance moment does not occur, which reduces vibration and noise owing to clearances of bearings or the like. That is, vibration and noise are lower than the conventional motor. This stepping motor theoretically generates double the torque of the same-size conventional motor of the full-main-pole structure shown in FIG. 14 and FIG. 15. Alternatively, when this stepping motor is designed so as to obtain the same torque as the motor of the full-main-pole structure, an air gap between the stator and the rotor can be larger, which reduces fraction defective and improves reliability. Since this stepping motor can use a cheap magnet such as a ferrite magnet, the manufacturing cost becomes lower than the conventional full-main-pole motor that uses a rare earth permanent magnet with high energy.

Although the motor structure disclosed in U.S. Pat. No. 6,781,260 requires that two permanent magnets are magnetized in the opposite polarities, an appropriate magnetization method has not been established. A permanent magnet is magnetized by a magnetic flux whose density reaches its saturation flux density. However, when a conventional magnetizing device with an air-core coil tries to magnetize two permanent magnets at the same time, the permanent magnets are insufficiently magnetized because the magnetic fluxes for magnetization repel to each other. On the other hand, when the conventional magnetizing device tries to magnetize two permanent magnets one by one with time difference, the magnetic flux for magnetizing the permanent magnet of one rotor unit leaks to the other rotor unit. The leakage magnetic flux may magnetize the permanent magnet of the other rotor unit in the polarity opposite to the desired polarity, or may demagnetize the permanent magnet of the other rotor unit that has been already magnetized. Conventionally, a permanent magnet that has been already magnetized alone is used to assemble a rotor. In such a method, however, since the permanent magnet attracts iron powder and dust during the assembling, the assembling of an electric rotating machine becomes difficult, and the reliability of the completed electric rotating machine decreases.

SUMMARY OF THE INVENTION

A first object of the present invention is to provide a manufacturing method that is capable of appropriately magnetizing two permanent magnets of an HB permanent magnet type electric rotating machine in which a rotor includes two sets of rotor units as disclosed in U.S. Pat. No. 6,781,260 after assembling an electric rotating machine or a rotor.

A second object of the present invention is to provide an HB permanent magnet type electric rotating machine that is suitable for the above-mentioned manufacturing method.

In order to accomplish the first object, a manufacturing method of an HB permanent magnet type electric rotating machine according to a first aspect of the present invention includes: constructing a stator of two-phase/four-pole, three-phase/three-pole, or five-phase/five-pole by winding excitation coils around respective main poles that are radially formed on a polygonal or annular magnetic substance of a stator core, and by forming a plurality of inductors on the tip portion of each of the main poles;

constructing a rotor by fixing a first rotor unit, which consists of a pair of rotor cores arranged with deviation of ½ the pitch of small teeth formed around the rotor cores in the circumferential direction and a magnetic material sandwiched between the rotor cores, and a second rotor unit, which has the same construction as the first rotor unit, to a common rotation shaft so that the positions of the small teeth of the adjacent rotor cores of the first and second rotor units are identical;

assembling the rotor to the stator with a predetermined air gap therebetween to make an assembled body so that the rotor is free to rotate by means of a first bracket arranged at the outside of the first rotor unit and a second bracket arranged at the outside of the second rotor unit;

magnetizing the magnet material of the first rotor unit in the axial direction by a magnetizing flux passing through the first bracket and the first rotor unit in the axial direction, passing through the stator core in a direction perpendicular to the axial direction, and passing through a first magnetizing path that connects the portion including the rotation shaft at the side of the first bracket to the outer circumference of the stator core through a yoke positioned outside the assembled body, whereby the magnetizing flux passes through a half of the assembled body in the axial direction; and magnetizing the magnet material of the second rotor unit in the axial direction in a polarity opposite to that of the magnet material of the first rotor unit by a magnetizing flux passing through the second bracket and the second rotor unit in the axial direction, passing through the stator core in a direction perpendicular to the axial direction, and passing through a second magnetizing path that connects the portion including the rotation shaft at the side of the second bracket to the outer circumference of the stator core through a yoke positioned outside the assembled body, whereby the magnetizing flux passes through the remaining half of the assembled body in the axial direction.

According to the above-mentioned first aspect, since the magnet materials are magnetized to form permanent magnets after the rotor is assembled to the stator, the rotor does not attract iron powder or dust during the assembling, the assembling of an electric rotating machine becomes easy, and the reliability of the completed electric rotating machine improves.

Further, since the magnetizing device is provided with the above-mentioned yoke, the magnet materials of the first and second rotor units can be appropriately magnetized in the opposite polarities, respectively.

Still further, the magnetizing device that is provided with the above-mentioned yoke can magnetize the magnet materials by smaller electric power as compared with the conventional magnetizing device that is provided with an air-core coil.

Since the assembled electric rotating machine is provided with the two sets of rotor units each of which includes the permanent magnet, the magnetic flux density required of each permanent magnet becomes smaller than that of a permanent magnet of the conventional rotor unit that has a single permanent magnet. Therefore, the assembled electric rotating machine can use a magnet formed from low cost magnet material such as a bonded magnet and a ferrite magnet. This can decrease the total cost of the electric rotating machine as compared with the cost of the conventional electric rotating machine that uses a magnet formed from high cost magnet material such as a neodymium magnet. Since the assembled electric rotating machine is provided with the two sets of rotor units, unbalance torque does not generate even if the stator has the small number of the main poles, which can reduce vibration and noise due to the unbalanced torque and can facilitate the assembling work of the stator due to simple windings.

In the first aspect, a magnetizing device that is provided with both of the first and second magnetizing paths or a magnetizing device that is provided with one of the first and second magnetizing paths can be used. In the former case, the magnet material of the first rotor unit and the magnet material of the second rotor unit are magnetized at the same time. In the latter case, the magnet material of the first rotor unit is magnetized, and then, the magnet material of the second rotor unit is magnetized after the assembled body is removed from the magnetizing device and is reset thereto.

The term "adjacent rotor cores" means not only a case where a pair of rotor cores are directly connected to form a single rotor core, but also a case where another member is inserted between a pair of rotor cores.

In order to accomplish the first object, a manufacturing method of an HB permanent magnet type electric rotating machine according to a second aspect of the present invention includes: constructing a stator of two-phase/four-pole, three-phase/three-pole, or five-phase/five-pole by winding excitation coils around respective main poles that are radially formed on a polygonal or annular magnetic substance of a stator core, and by forming a plurality of inductors on the tip portion of each of the main poles;

constructing a rotor by fixing a first rotor unit, which consists of a pair of rotor cores arranged with deviation of ½ the pitch of small teeth formed around the rotor cores in the circumferential direction and a magnetic material sandwiched between the rotor cores, and a second rotor unit, which has the same construction as the first rotor unit, to a common rotation shaft so that the positions of the small teeth of the adjacent rotor cores of the first and second rotor units are identical;

magnetizing the magnet material of the first rotor unit in the axial direction by a magnetizing flux passing through the magnet material of the first rotor unit in the axial direction, and passing through a first magnetizing path that connects a side surface or a portion including an outer circumference of the outside rotor core of the first rotor unit to the outer circumference of the inside rotor core of the first rotor unit through a yoke positioned outside the rotor;

magnetizing the magnet material of the second rotor unit in the axial direction in a polarity opposite to that of the magnet material of the first rotor unit by a magnetizing flux passing through the magnet material of the second rotor unit in the axial direction, and passing through a second magnetizing path that connects a side surface or a portion including an outer circumference of the outside rotor core of the second rotor unit to the outer circumference of the inside rotor core of the second rotor unit through a yoke positioned outside the rotor; and assembling the rotor to the stator with a predetermined air gap therebetween so that the rotor is free to rotate by means of a first bracket arranged at the outside of the first rotor unit and a second bracket arranged at the outside of the second rotor unit.

According to the above-mentioned second aspect, since the magnet materials are magnetized to form permanent magnets after the rotor is constructed, the rotor does not attract iron powder or dust during the construction of the rotor, the construction of the rotor becomes easy, and the reliability of the completed electric rotating machine improves.

Further, since the magnetizing device is provided with the above-mentioned yoke, the magnet materials of the first and second rotor units can be appropriately magnetized in the opposite polarities, respectively.

Still further, the magnetizing device that is provided with the above-mentioned yoke can magnetize the magnet materials by smaller electric power as compared with the conventional magnetizing device that is provided with an air-core coil.

Since the assembled electric rotating machine according to the method of the second aspect is identical to that according to the method of the first aspect, the machine has the same effects as described above. That is, the total cost of the electric rotating machine decreases, vibration and noise due to the unbalanced torque is reduced, and the assembling work of the stator becomes easier due to simple windings.

In the second aspect, simultaneous magnetization and time-difference magnetization are possible in the same manner as the first aspect mentioned above.

In either of the first and second aspects, an electric conduction member may be installed between the first rotor unit and the second rotor unit when the rotor is constructed.

In order to accomplish the above-mentioned second object, an HB permanent magnet type electric rotating machine of the present invention includes: a stator of two-phase/four-pole, three-phase/three-pole, or five-phase/five-pole, that is constructed by winding excitation coils around respective main poles that are radially formed on a polygonal or annular magnetic substance of a stator core, and by forming a plurality of inductors on the tip portion of each of the main poles; and a rotor that is constructed by fixing a first rotor unit, which consists of a pair of rotor cores arranged with deviation of ½ the pitch of small teeth formed around the rotor cores in the circumferential direction and a magnetic material sandwiched between the rotor cores, a second rotor unit, which has the same construction as the first rotor unit, to a common rotation shaft so that an electric conduction member is sandwiched between the first and second rotor units and so that the positions of the small teeth of the adjacent rotor cores of the first and second rotor units are identical, wherein the rotor is assembled to the stator with a predetermined air gap therebetween so that the rotor is free to rotate by means of a first bracket arranged at the outside of the first rotor unit and a second bracket arranged at the outside of the second rotor unit.

According to the above-mentioned configuration, since an eddy current flows in the electric conduction member, the leakage magnetic flux to the magnetic material of the opposite rotor unit decreases. The electric conduction member, which is made from copper, aluminum or the like, is preferably formed as a disc-shaped member. Therefore, the above-described configuration of the electric rotating machine is suitable for applying the manufacturing method of the first and second aspects of the present invention mentioned above.

DESCRIPTION OF THE ACCOMPANYING DRAWINGS

Figure 1:
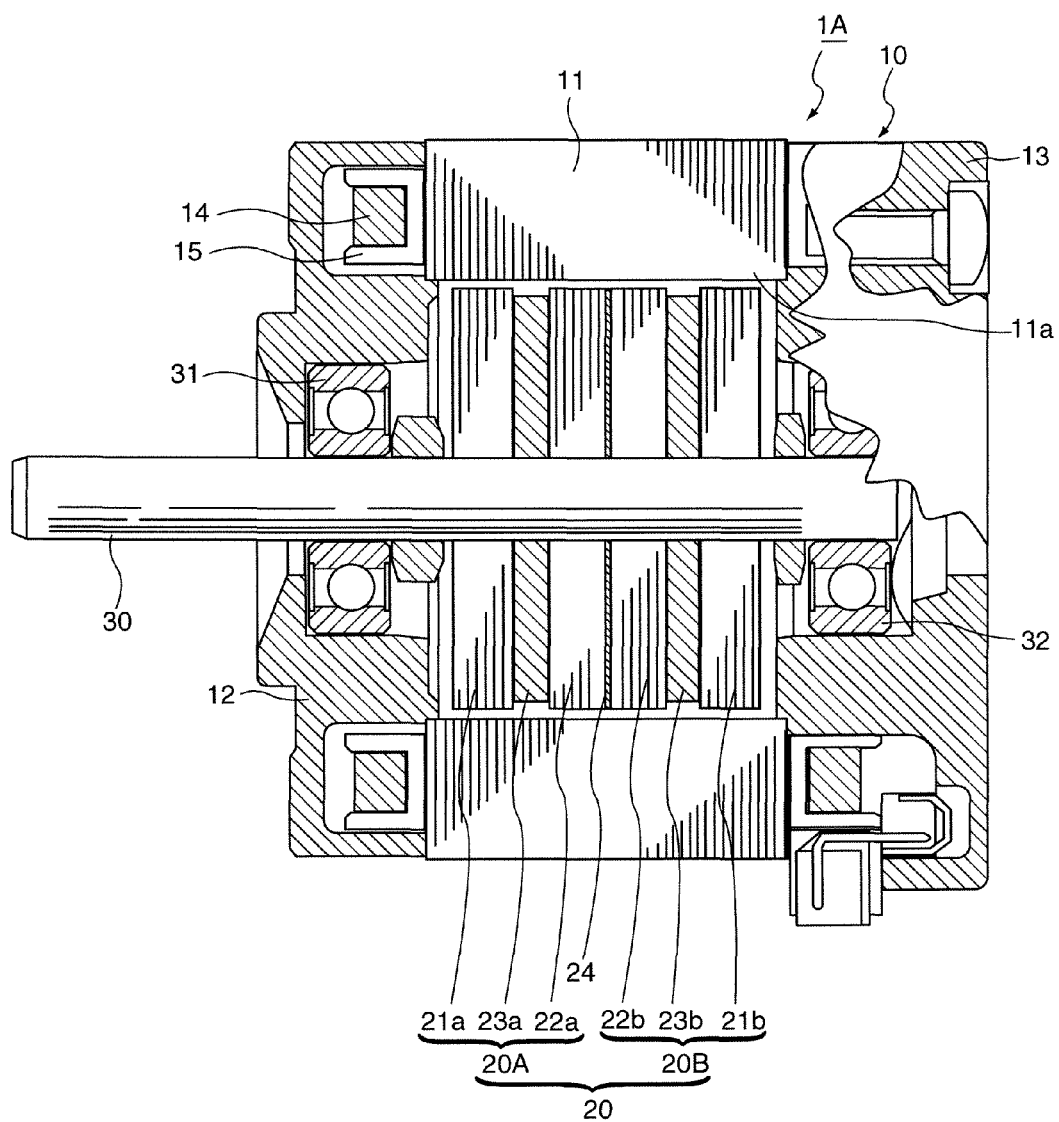
Figure 2:
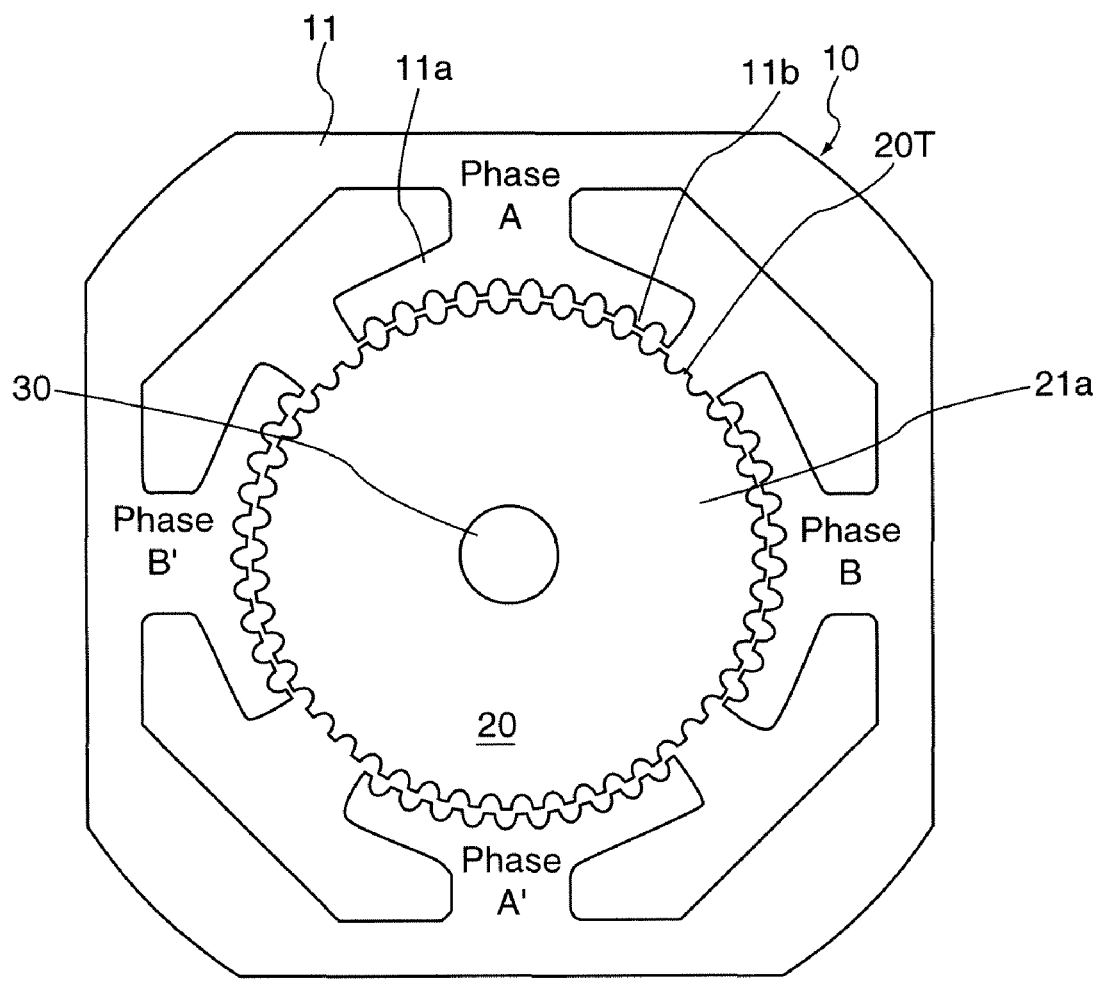
Figure 3:
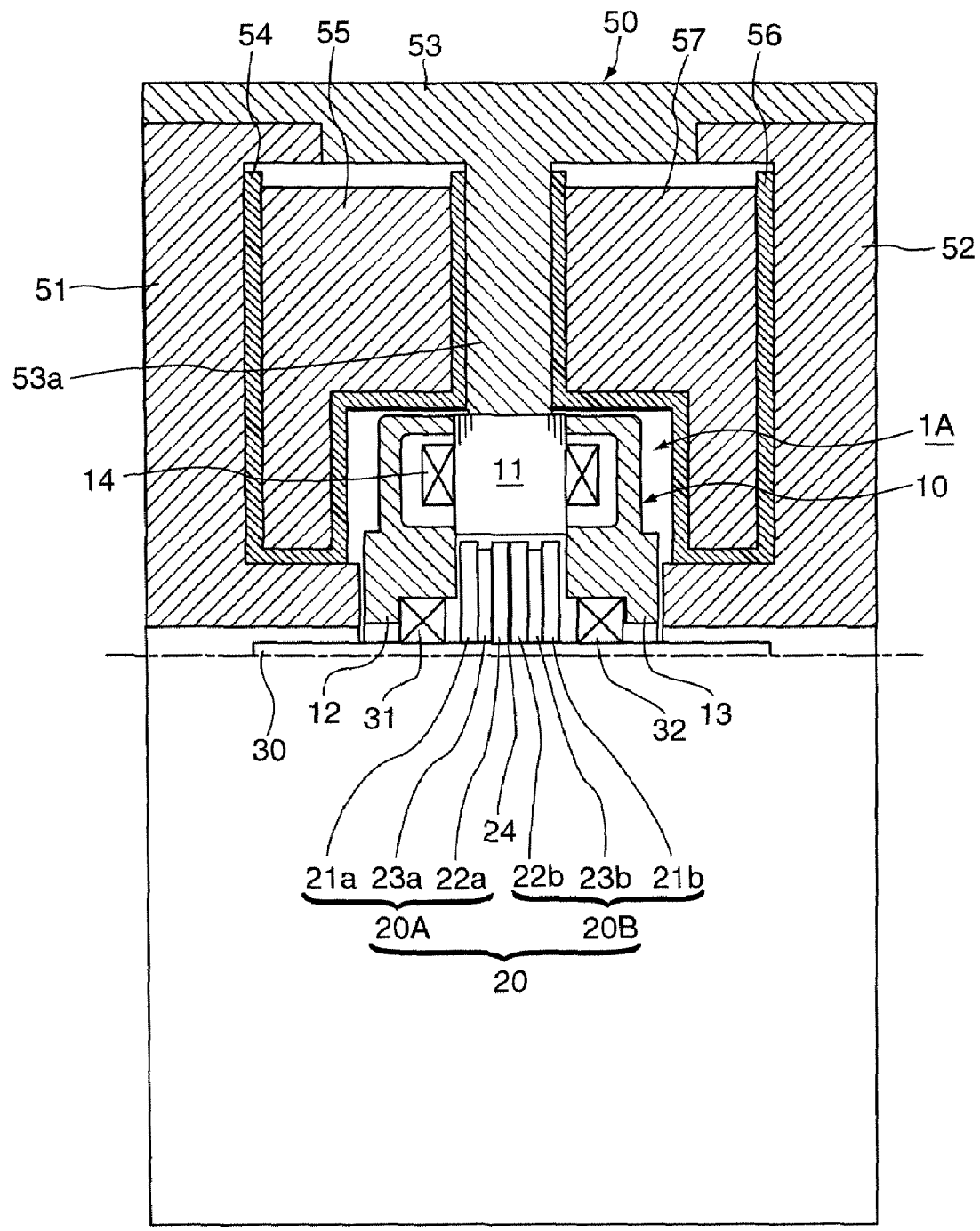
Figure 4:
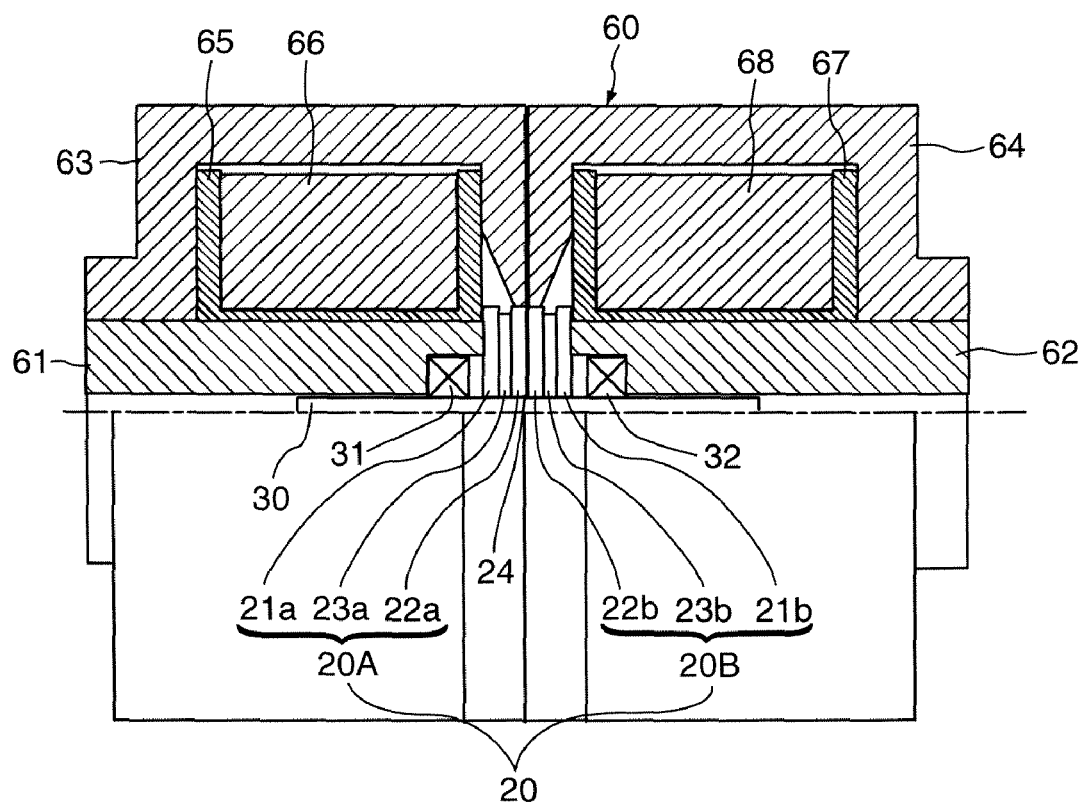
Figure 5:
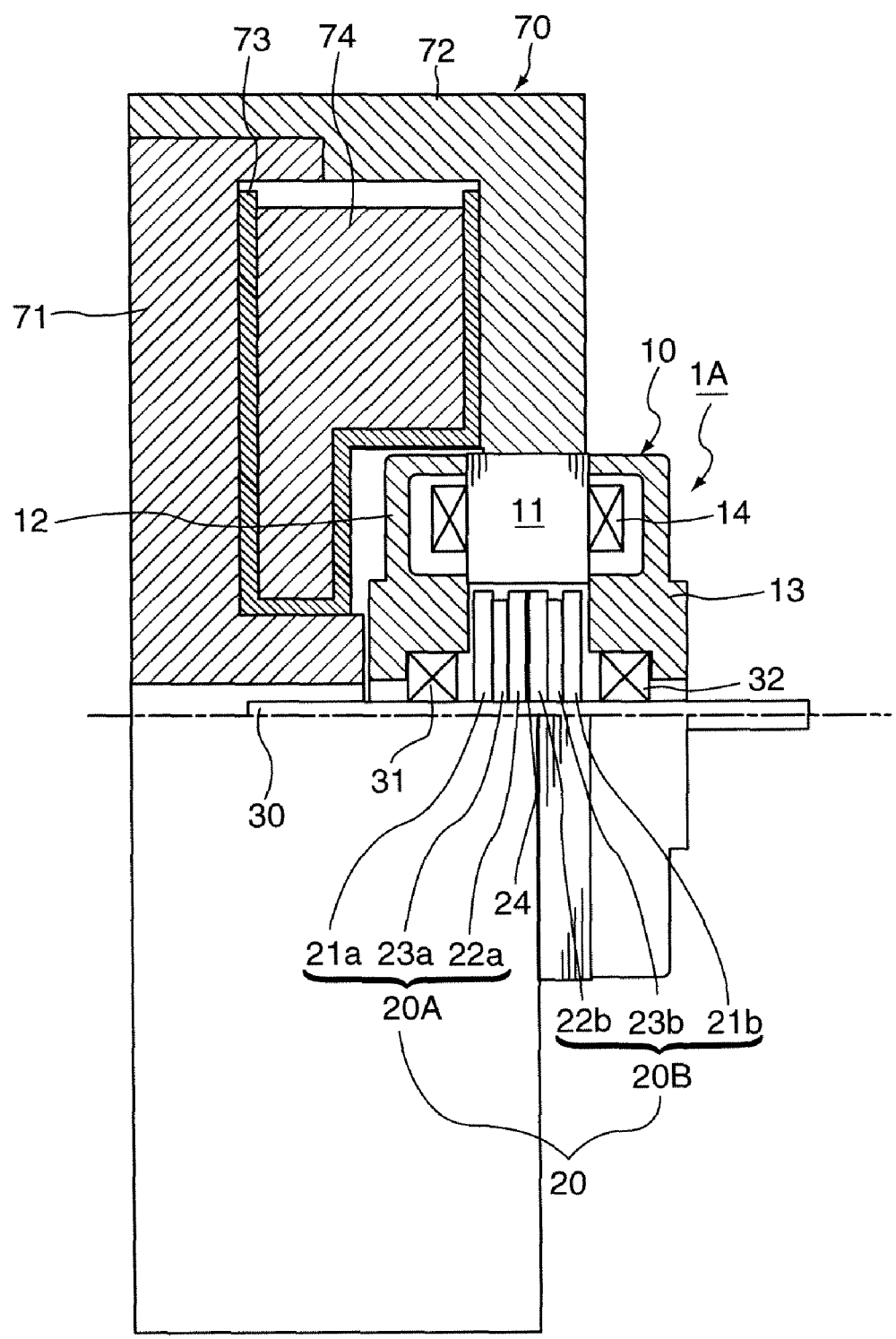
Figure 6:
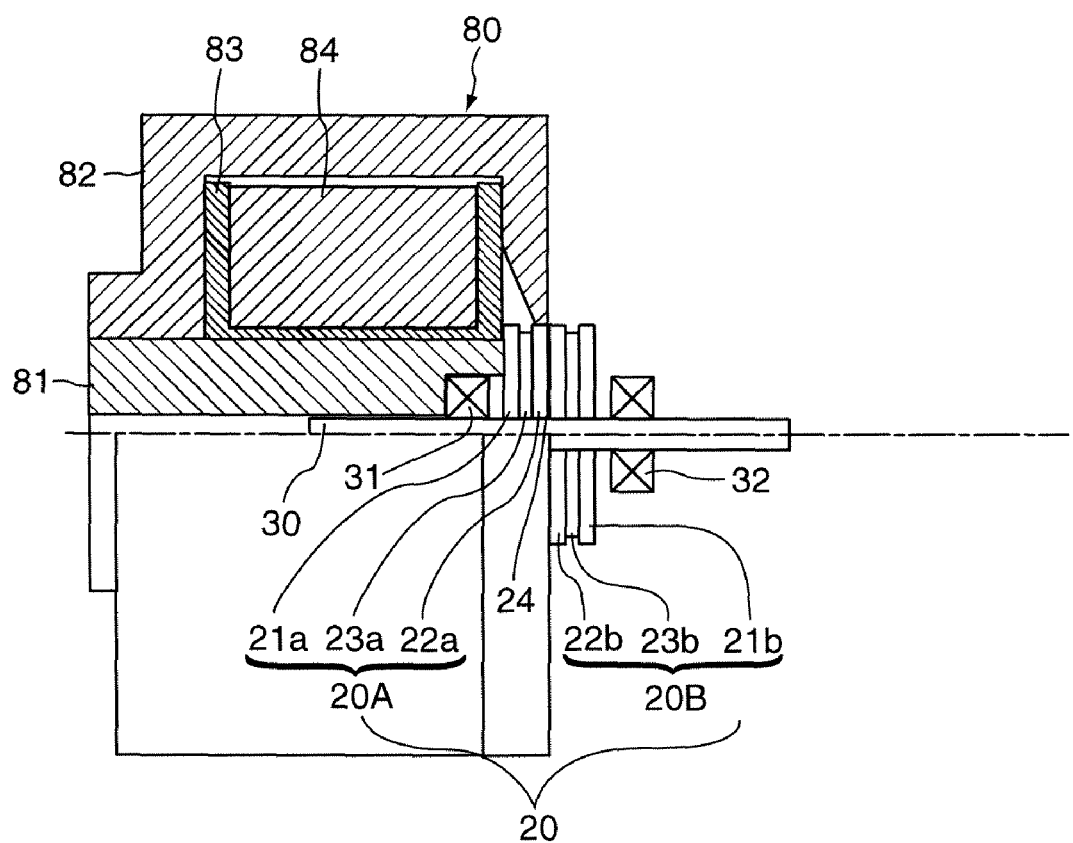
Figure 7:
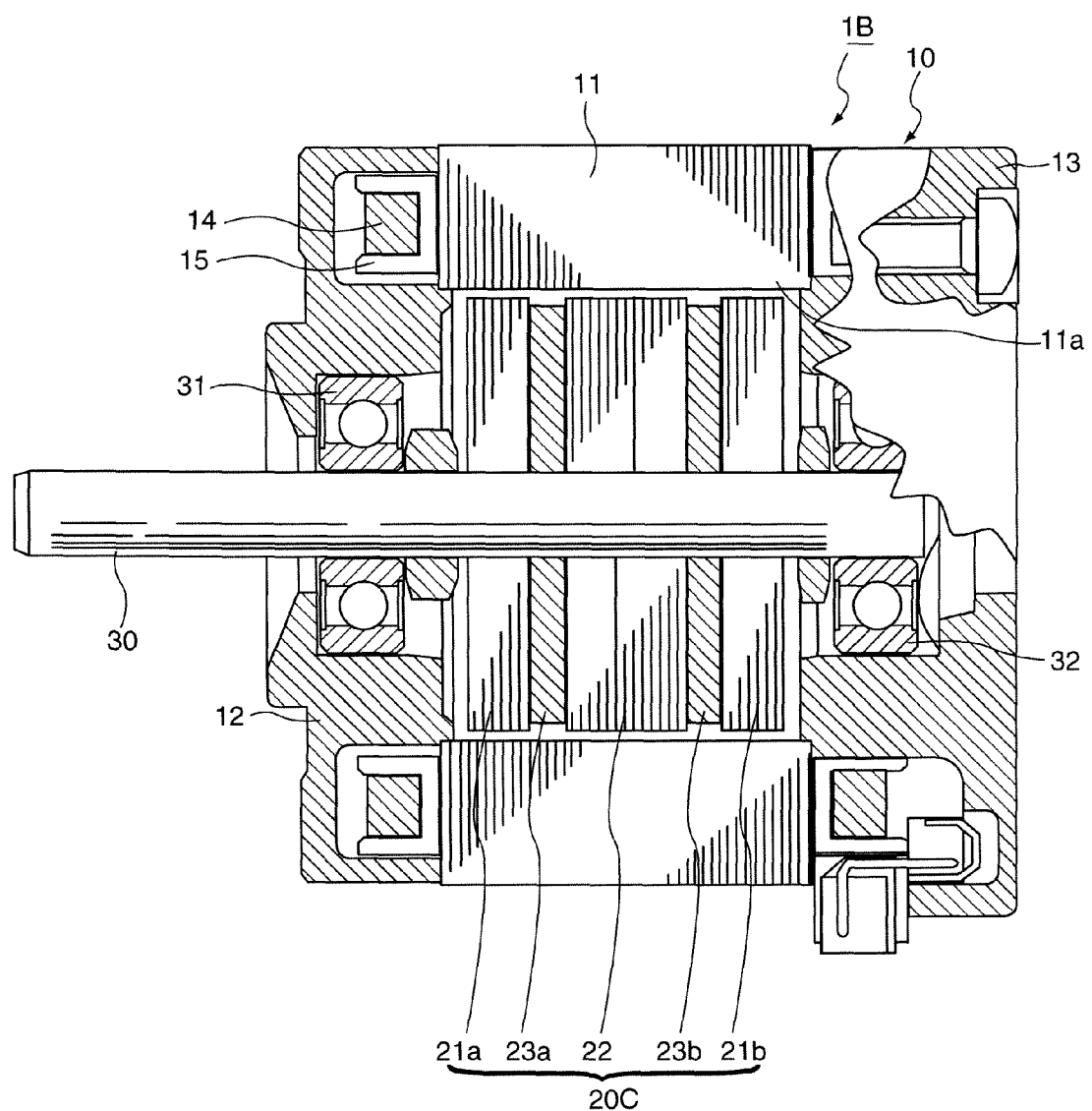
Figure 8:
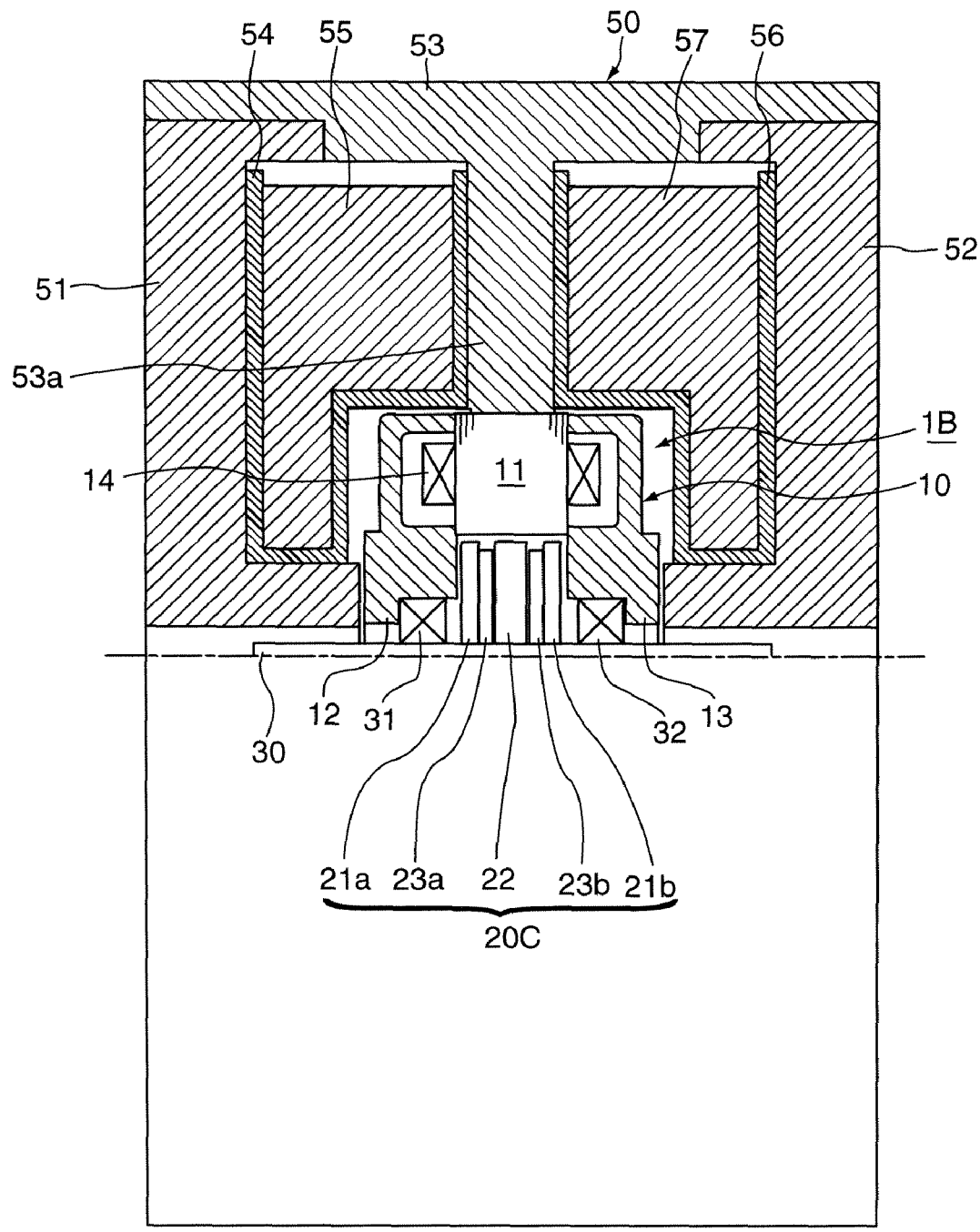
Figure 9:
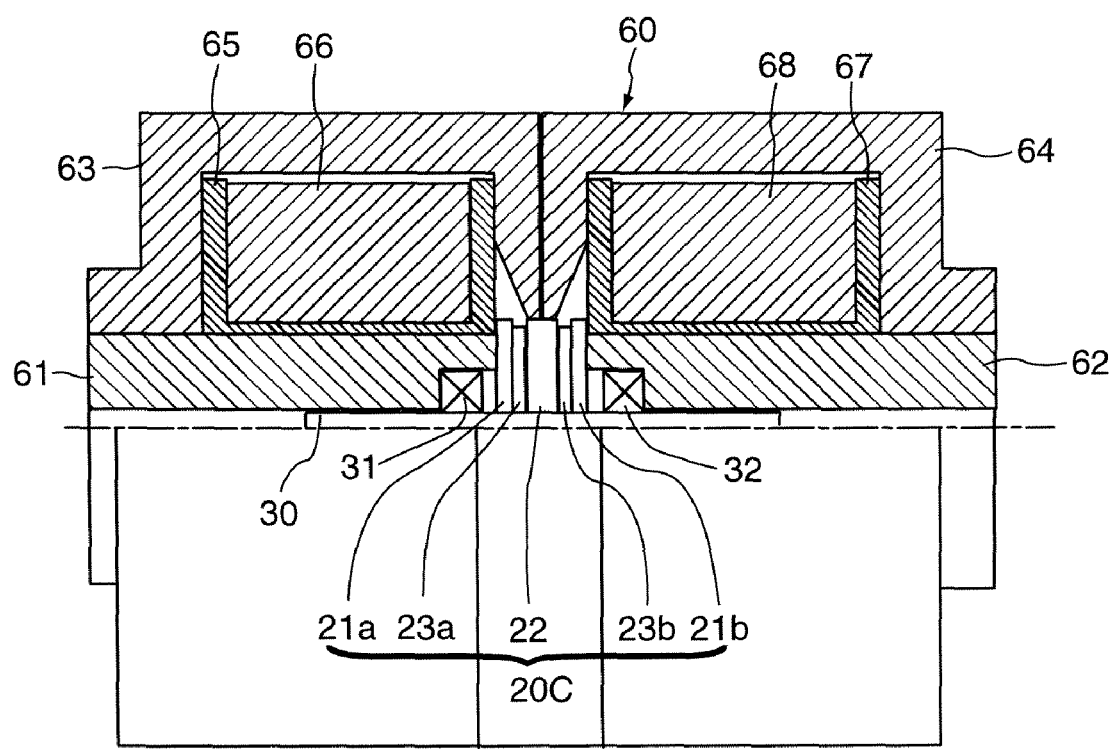
Figure 10:
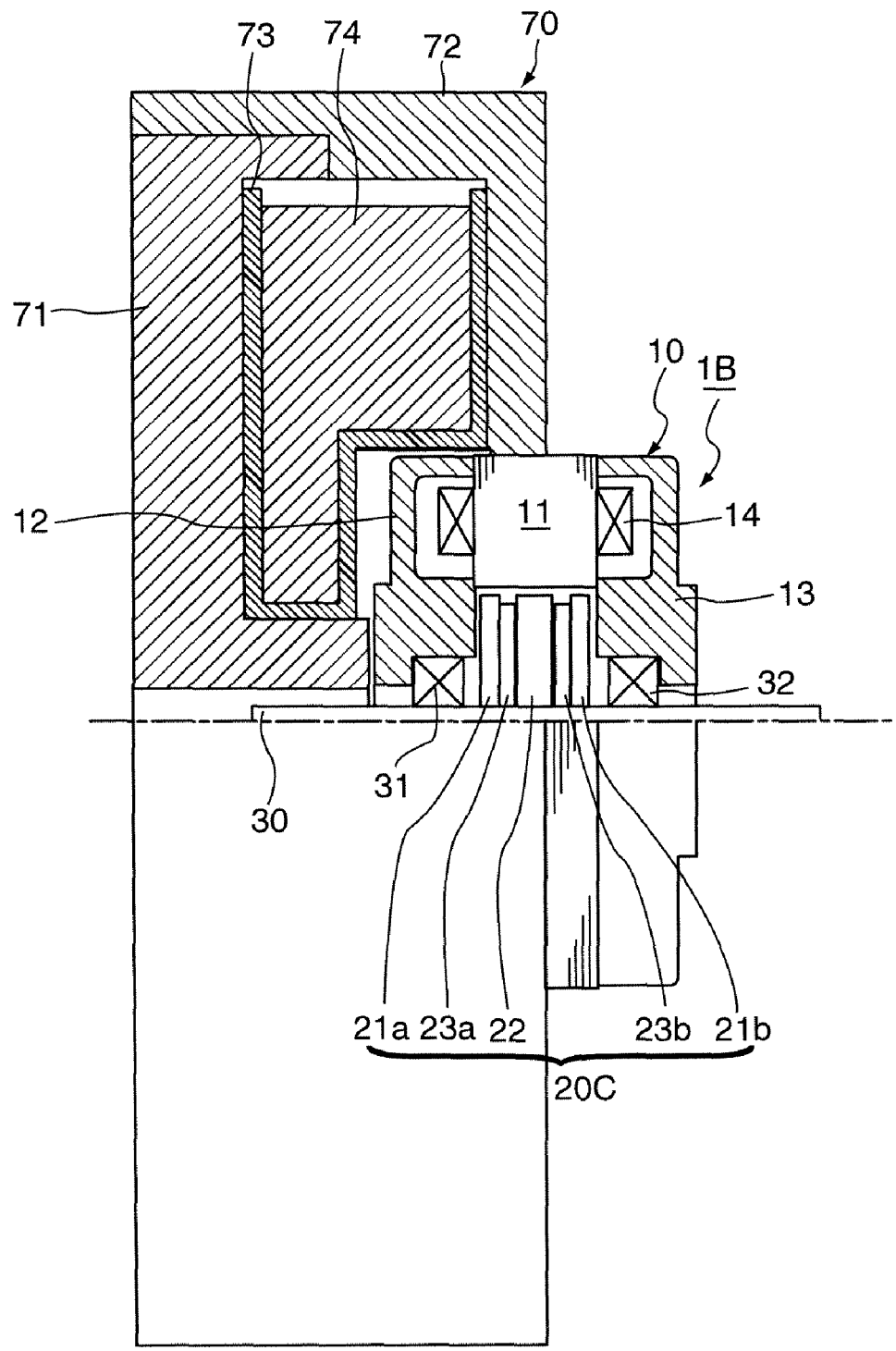
Figure 11:
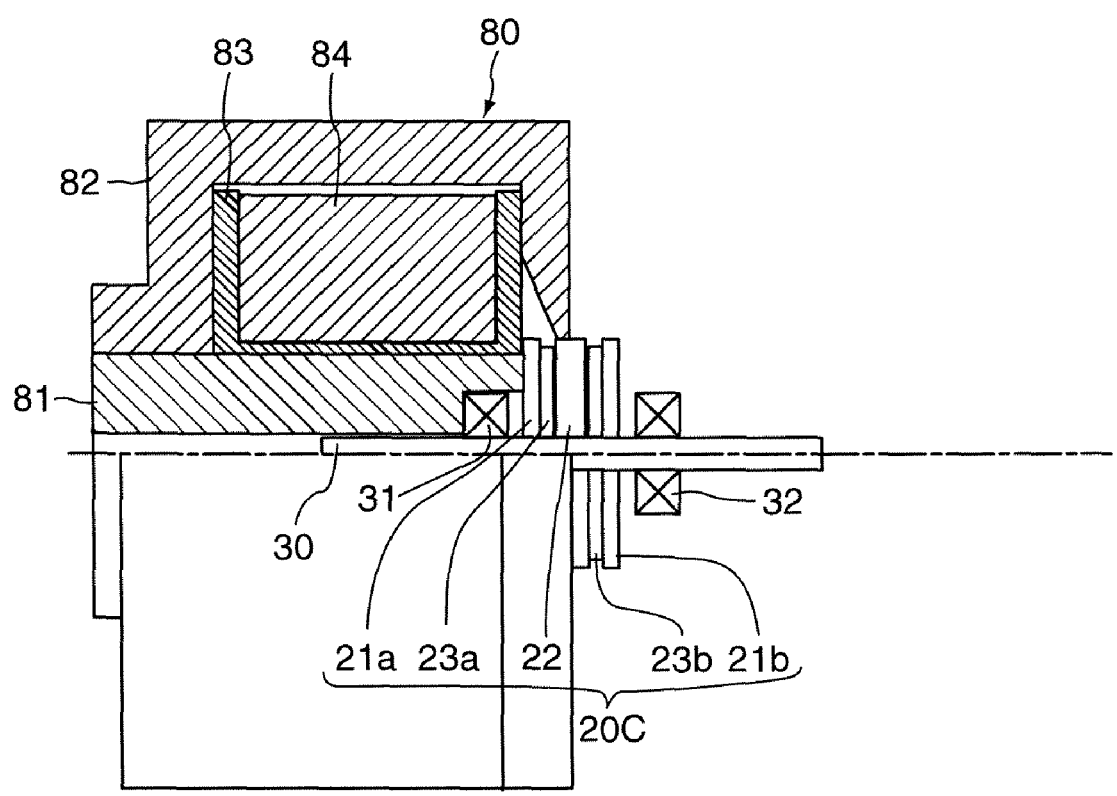
Figure 12:
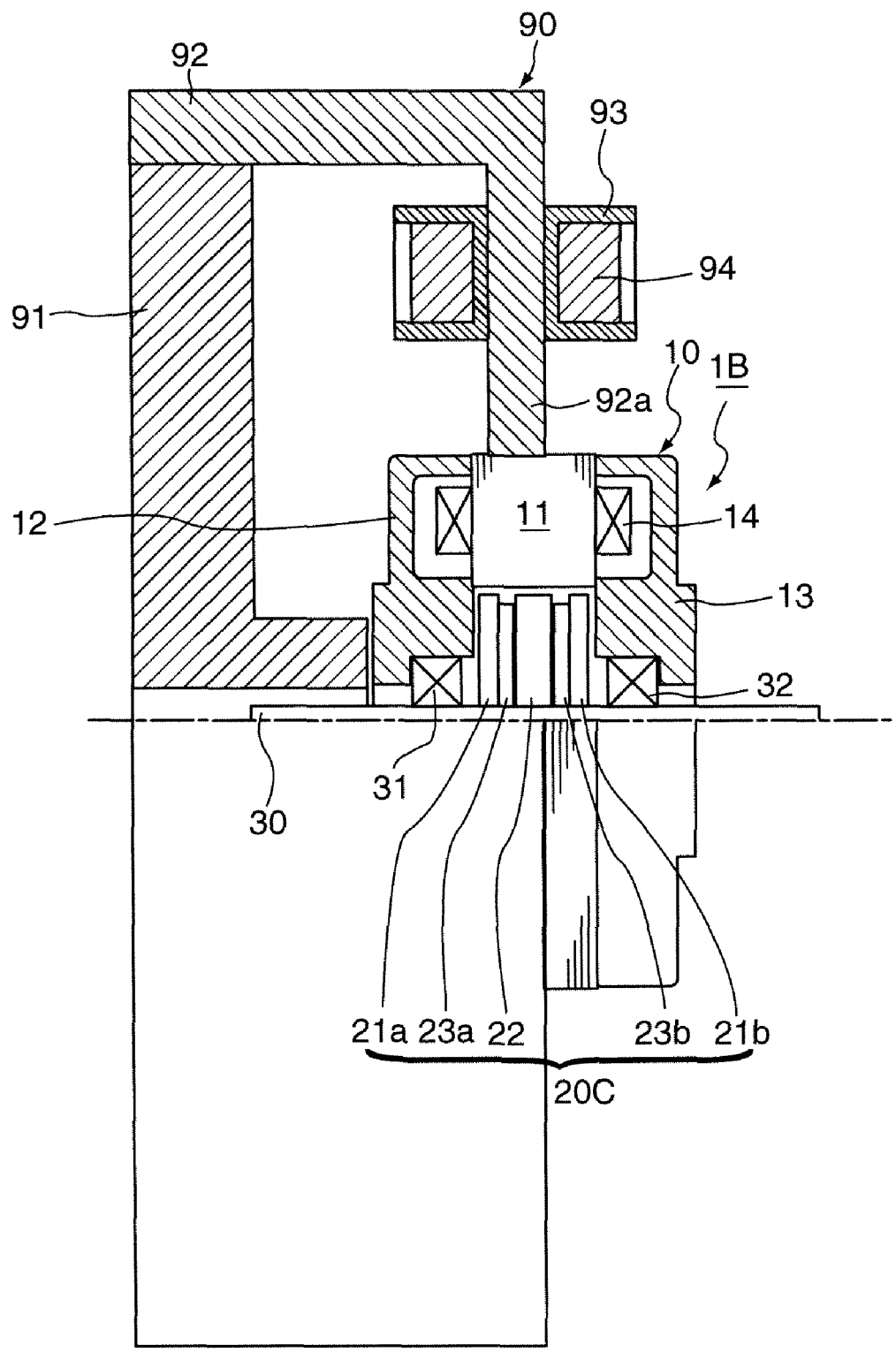
Figure 13:
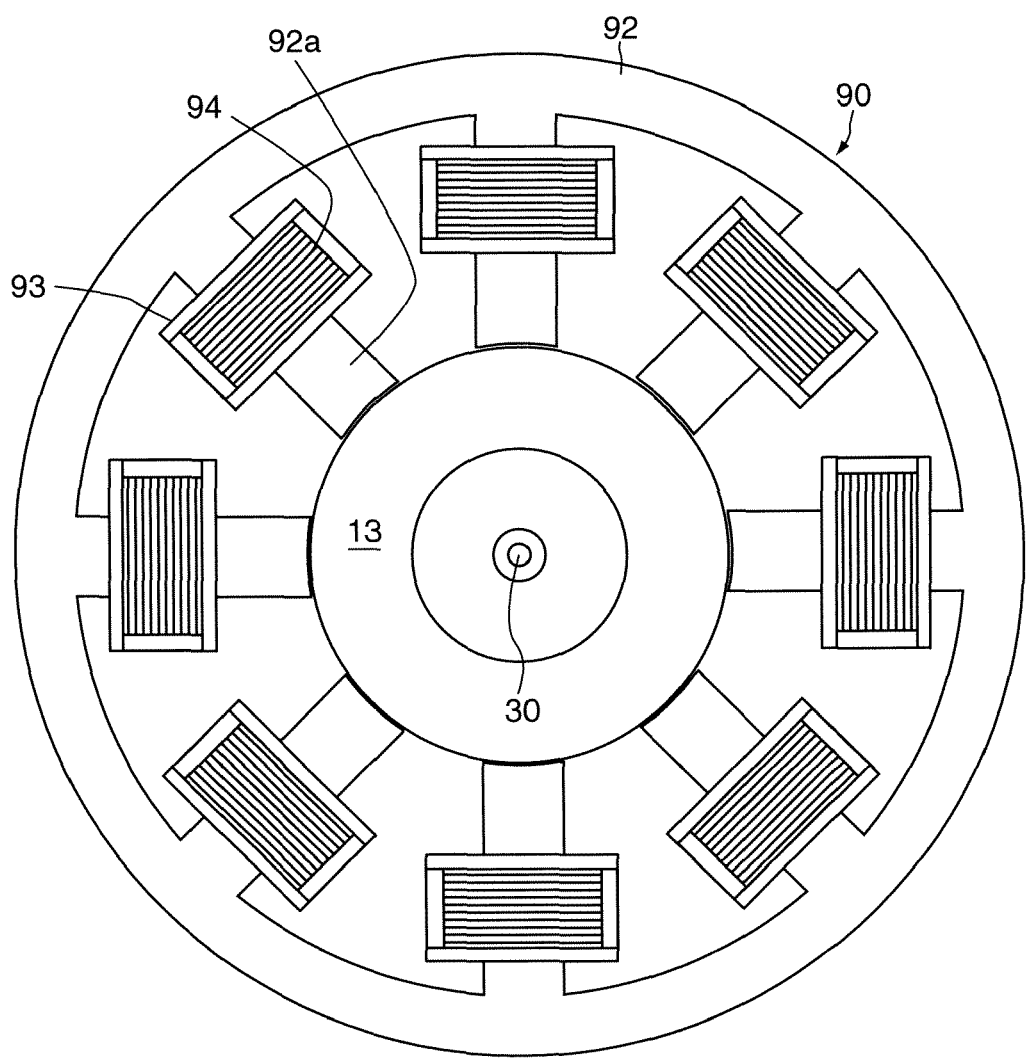

FIG. 1 is a longitudinal sectional view of a stepping motor to which the manufacturing methods of an HB permanent magnet type electric rotating machine concerning first, second, third, and fourth embodiments of the present invention are applied, FIG. 2 is a front view of the stepping motor shown in FIG. 1 showing the relationship between a rotor core and a stator core, FIG. 3 is a longitudinal sectional view of a magnetizing device used in the manufacturing method of the first embodiment of the present invention, FIG. 4 is a longitudinal sectional view of a magnetizing device used in the manufacturing method of the second embodiment of the present invention, FIG. 5 is a longitudinal sectional view of a magnetizing device used in the manufacturing method of the third embodiment of the present invention, FIG. 6 is a longitudinal sectional view of a magnetizing device used in the manufacturing method of the fourth embodiment of the present invention, FIG. 7 is a longitudinal sectional view of a stepping motor to which the manufacturing methods of an HB permanent magnet type electric rotating machine concerning fifth, sixth, seventh, eighth, and ninth embodiments of the present invention are applied, FIG. 8 is a longitudinal sectional view of a magnetizing device used in the manufacturing method of the fifth embodiment of the present invention, FIG. 9 is a longitudinal sectional view of a magnetizing device used in the manufacturing method of the sixth embodiment of the present invention, FIG. 10 is a longitudinal sectional view of a magnetizing device used in the manufacturing method of the seventh embodiment of the present invention, FIG. 11 is a longitudinal sectional view of a magnetizing device used in the manufacturing method of the eighth embodiment of the present invention, FIG. 12 is a longitudinal sectional view of a magnetizing device used in the manufacturing method of the ninth embodiment of the present invention, FIG. 13 is a front view of the magnetizing device shown in FIG. 12, FIG. 14 is a longitudinal sectional view of a conventional hybrid type stepping motor, and FIG. 15 is a front view of the stepping motor shown in FIG. 14 showing the relationship between a rotor core and a stator core.

DESCRIPTION OF THE EMBODIMENTS

Hereafter, nine embodiments of the manufacturing method of the HB permanent magnet type electric rotating machine according to the present invention will be described with reference to the attached drawings. The first embodiment through the fourth embodiment show the methods for manufacturing the HB permanent magnet type electric rotating machine of the present invention that is an improvement of the electric rotating machine disclosed in U.S. Pat. No. 6,781,260. The fifth embodiment through the ninth embodiment show the methods for manufacturing the HB permanent magnet type electric rotating machine that has the same basic configuration as that disclosed in U.S. Pat. No. 6,781,260. The first embodiment and the fifth embodiment support the first aspect, and the second embodiment and the sixth embodiment support the second aspect mentioned above. The third embodiment and the seventh embodiment are modifications of the first embodiment and the fifth embodiment, respectively. The fourth embodiment and the eighth embodiment are modifications of the second embodiment and the sixth embodiment, respectively.

First, the configuration of the HB permanent magnet type electric rotating machine as a stepping motor (hereinafter referred to as a stepping motor) to which the manufacturing methods of the first embodiment through the fourth embodiment are applied is described with reference to FIG. 1 and FIG. 2.

FIG. 1 is a longitudinal sectional view of the stepping motor, and FIG. 2 is a front view of an inside of the motor of FIG. 2 viewed in an axial direction. However, excitation coils are not illustrated in FIG. 2.

The stepping motor 1A is an inner rotor HB type stepping motor constituted by arranging a HB type rotor 20 into a stator 10 that consists of magnetic substance of four-pole structure. As shown in FIG. 2, the stator 10 is provided with a stator core 11 having four main poles 11a of phase A, phase B, phase A', and phase B' that are radially extended from a rectangular magnetic substance toward inside. A plurality of small teeth (inductors) 11b are formed on the tip portion of each main pole 11a that faces to the rotor 20. As shown in FIG. 1, the excitation coil 14 is wound around each main pole 11a via a bobbin 15 made from insulation material. The four excitation coils, which are wound around the respective main poles 11a, are connected so that opposite pair of coils positioned at 180 degrees are excited in reverse polarities to form two-phase winding. As a result, the two-phase four-pole stator 10 is constituted. The two-phase motor shown in FIGS. 14 and 15 employs a full-main-pole structure having eight main poles. On the contrary, the two-phase motor of the embodiment employs reduced-main-pole structure (the half-main-pole structure) having four main poles.

The stator core 11 is formed by stacking silicon steel plates and is held by brackets 12 and 13, which are made from nonmagnetic substance such as aluminum, from both sides in the axial direction, as shown in FIG. 1.

On the other hand, the rotor 20 is constructed by fixing a first rotor unit 20A and a second rotor unit 20B to a common rotation shaft 30 so that a disc-shaped electric conduction member 24 is sandwiched between the first and second rotor units. The first rotor unit 20A consists of a pair of rotor cores 21a, 22a and a permanent magnet 23a that is sandwiched between the rotor cores 21a, 22a. The second rotor unit 20B consists of a pair of rotor cores 21b, 22b and a permanent magnet 23b that is sandwiched between the rotor cores 21b, 22b. The permanent magnet 23a is magnetized in the axial direction. The permanent magnet 23b is magnetized in the axial direction in a polarity opposite to that of the permanent magnet 23a. All of the rotor cores are formed as the same size and the same structure. The permanent magnets 23a and 23b are magnetized in the opposite directions to each other with respect to the axial direction. For example, in this example, the permanent magnets are magnetized so that the outside rotor core 21a of the first rotor unit 20A and the outside rotor core 21b of the second rotor unit 20B are magnetized in N-pole and so that the inside rotor cores 22a and 22b are magnetized in S-pole. Each rotor core is formed by stacking silicon steel plates.

As shown in FIG. 2, a plurality of small teeth 20T are formed in even pitch on the circumference of the rotor core 21a. Small teeth are also formed around the other three rotor cores 22a, 21b, and 22b. The two rotor cores 21a and 22a of the first rotor unit 20A are arranged with deviation of ½ pitch of the small teeth 20T in the circumferential direction. Similarly, the two rotor cores 21b and 22b of the second rotor unit 20B are arranged with deviation of ½ pitch of the small teeth 20T in the circumferential direction. The small teeth 20T of the inside rotor core 22a of the first rotor unit 20A are coincident with the small teeth 20T of the inside rotor core 22b of the second rotor unit 20B. Accordingly, the small teeth 20T of the outside rotor core 21a of the first rotor unit 20A are coincident with the small teeth 20T of the outside rotor core 21b of the second rotor unit 20B.

The electric conduction member 24 shown in FIG. 1 is a disc-shaped member having the same diameter as that of the rotor cores. However, the diameter of the electric conduction member 24 may be smaller than the rotor core's diameter and may be formed as copper foil sheet. Although the electric conduction member 24 is preferably circular, it may be polygon.

The relationship between the small teeth 11b of the main pole 11a of the stator core 11 and the small teeth 20T of the rotor cores 21a, 22a, 21b, and 22b is as follows. For example, assuming that only one phase is excited, when the small teeth 20T of the rotor cores 21a and 21b in N-pole face the small teeth 11b of the main pole 11a of the first phase excited in S-pole in the stator core 11, the small teeth 11b of the main pole 11a of the first phase excited in N-pole in stator core 11 do not face the small teeth 20T of the rotor cores 21a and 21b in N-pole (teeth face groove, i.e., there is phase difference of 180 degrees in an electrical angle). They face the small teeth 20T of the rotor cores 22a and 22b in S-pole. At the time, there is phase difference of 90 degrees between the small teeth 11b of the main pole 11a of the second phase that is not excited and the small teeth 20T of the rotor cores 21a, 21b, 22a, and 22b.

The rotation shaft 30 to which the first and second rotor units 20A and 20B are fixed is rotatably supported by bearings 31 and 32 that are attached to insides of the brackets 12 and 13, respectively. This keeps an air gap between the small teeth 11b of the main poles 11a of the stator core 11 and the small teeth 20T of the rotor cores 21a, 22a, 21b, and 22b, which allows the rotor 20 to rotate together with the rotation shaft 30.

In the above-description, it is expressed that the rotor 20 is constructed by connecting two rotor units, which consists of the first rotor unit 20A (consists of 21a, 22a, and 23a) and the second rotor unit 20B (consists of 21b, 22b, and 23b) in the axial direction. It can be also expressed that the rotor 20 consists of a special rotor that is provided with the two permanent magnets 23a and 23b, the inside rotor cores 22a and 22b that are sandwiched by the permanent magnets, and the outside rotor cores at both sides thereof. The small teeth 20T of the center rotor cores 22a and 22b are deviated from that of the outside rotor cores 21a and 22a by ½ pitch of the small teeth 20T. The electric conduction member 24 is arranged between the inside rotor cores 22a and 22b.

Since the motor of the embodiment has two sets of rotor units, it can erase unbalance electromagnetic force in the radial direction that generates by the combination of the four-pole stator and the conventional HB type rotor that has an only one rotor unit. That is, since the rotor 20 of the stepping motor 1A of the embodiment is symmetrical with respect to the electric conductive member 24 at the center in the axial direction, it functions as if two symmetrical HB rotors cancel the couple of forces of the unbalanced electromagnetic force. Therefore, the stepping motor 1A has a superior effect that the couple of forces due to the unbalanced electromagnetic forces in the radial direction can be always canceled.

FIG. 1 and FIG. 2 show the two-phase motor. However, the present invention is not limited to the two-phase motor, the motor may be constructed as a three-phase or five-phase HB type stepping motor in which the reduced-main-pole stator such as a three-phase/three-pole stator, or a five-phase/five-pole stator is combined with the special rotor having two permanent magnets. In addition, the present invention can be applied to a two-phase or three-phase brushless motor or a synchronous motor.

Next, the torque of the motor, which is a combination of the four-pole stator 10 of the embodiment shown in FIG. 2 and the above-described rotor 20, and the torque of the motor, which is a combination of the eight-pole stator shown in FIG. 14 and the above-described rotor 20, will be described. Torque $T_1$ for one phase is shown by the following equation (1), $$T_1 = N \times Nr \times i \times \Phi m \tag{1}$$

where, N denotes the turn number of the coil, Nr denotes the tooth number of the rotor core, i denotes an electric current, $\Phi m$ denotes flux linkage of the magnetic flux of the permanent magnet of the rotor with respect to the coil.

It is assumed that a diameter and the total turn number Nt of the coil of the four-pole stator are identical to that of the eight-pole stator. When the tooth number of the four-pole stator is equal to that of the eight-pole stator (for example, the tooth number is equal to 48, that is obtained by 4×12=48 in the four-pole stator and by 8×6=48 in the eight-pole stator), the total magnetic flux amount from the rotor can be approximated to the same value $\Phi t$ in both cases, because the difference in the magnetic resistances of the stator cores of both stators can be ignored. Therefore, the following equations are obtained. In the equations, the turn number and magnetic flux per one main pole in the eight-pole motor and the four-pole motor are represented by N8, N4, $\Phi 8$ and $\Phi 4$, respectively.

$$\Phi 8 = \Phi t / 8 \tag{2}$$

$$\Phi 4 = \Phi t / 4 \tag{3}$$

$$N8 = Nt/8 \tag{4}$$

$$N4 = Nt/4 \tag{5}$$

According to the equation (1) through (5), the torques $T_8$ and $T_4$ of the eight-pole motor and the four-pole motor are expressed by the followings.

$$T_8 = 2 \times 4(Nt/8)Nr \times i(\Phi t/8) \tag{6}$$
$$= Nt \times Nr \times i \times \Phi t/8$$

$$T_4 = 2 \times 2(Nt/4)Nr \times i(\Phi t/4) \tag{7}$$
$$= Nt \times Nr \times i \times \Phi t/4$$

The equations (6) and (7) show that the four-pole motor generates double the torque of the eight-pole motor.

Preferable tooth number Nr of the rotor for the four-pole motor is led from the following equations:

$$90/Nr = (-/+)\{(360/4) - 360n/Nr\} \tag{8}$$

where, n is an integer equal to or larger than 1.

The left and right sides of the equation (8) represent the step angles of the four-pole motor and an equation (9) can be obtained therefrom.

$$Nr = 4n \pm 1 \tag{9}$$

When the equation (9) is satisfied, the two-phase/four-pole motor has a symmetrical structure. For example, Nr=75 when n=19 and since a step angle is obtained by (90/Nr) in a two phase motor, an electric rotating machine having a symmetric stator with step angles of 1.2 degrees can be obtained. In the case of Nr=50, although a stator is asymmetrical because the equation (9) is not satisfied, a two-phase stepping motor with step angles of 1.8 degrees can be obtained.

Since the stator core of the two-phase/four-pole motor becomes symmetrical with the 90 degrees, when stacking silicon steel plates, press punched steel plates can be stacked with rotating by 90 degrees. If the steel plates can be stacked with rotating, the deviation of stacked thickness and the magnetic directivity of the silicon steel plate can be cancelled, which increases a performance of a motor.

Next, a reason why the stepping motor 1A of the embodiment, which employs two permanent magnets, can obtain high torque even if it uses low-grade magnets will be described as compared with the conventional two-phase/eight-pole stepping motor shown in FIGS. 14 and 15 that uses one permanent magnet. The conventional two-phase/eight-pole stepping motor employed a rare earth permanent magnet (a neodymium magnet) whose residual flux density Br is 1.3 [T] (tesla) as a permanent magnet. On the other hand, since the two-phase/four-pole stepping motor of the embodiment employs two permanent magnets, a residual flux density Br can be obtained by the following equation.

$$Br = 1.3 \ [T] \times (1/2)(3/2)(4/8) = 0.4875 \ [T] \tag{10}$$

The equation (10) includes the term (1/2) because of the following reason. That is, since the area of outer surface of rotor core magnetized by one permanent magnet in the embodiment becomes about 1/2 of that of the conventional HB type rotor of the same size that is combined with the eight-pole stator, the magnetic flux generated by the permanent magnet may become half. Therefore, if the area of permanent magnet is constant, the magnetic flux density may become half. Further, the equation (10) includes the term (3/2) because of the following reason. That is, since the magnetic path length is reduced by half, the permeance in the iron core becomes double simply. The value (3/2) is an approximate value that is totally determined in consideration of reduction of magnetic flux density in an air gap and a magnetic path. The equation (10) includes the term (4/8) that means (four-pole/eight-pole) because a torque is inversely proportional to the number of the main poles, which is shown by the relation between the equations (6) and (7) mentioned above.

The stepping motor 1A of the embodiment with the permanent magnets whose magnetic flux density is equal to the value of Br (=0.4875) obtained by the equation (10) has a torque as high as the conventional eight-pole motor with a neodymium magnet whose magnetic flux density Br is 1.3 [T]. The result of the equation (10) is approximately in agreement with the magnetic field analysis output by the computer.

The value of Br in the equation (10) corresponds to a ferrite magnet. A magnetic flux density Br of a ferrite magnet is 0.5 [T] and a holding torque thereof is Hcj=275 kA/m. A demagnetizing curve of a ferrite magnet becomes a straight line in a second quadrant of a coordinate in which vertical axis defines a magnetic flux density and horizontal axis defines a holding torque. Since an intersection of a straight line whose gradient is a permeance coefficient of a permanent magnet mounted in a magnetic path and the demagnetizing curve becomes an operating point. Since the magnetic flux density at the operating point is approximately proportional to the Br of the permanent magnet, the equation (6) holds as an approximate expression. Since the ferrite magnet is extremely cheap compared with the rare earth permanent magnet, the cost of the rotor with two ferrite magnets is cheaper than the cost of the conventional rotor with one rare earth magnet. That is, a sufficient practical torque can be obtained with the magnet whose magnetic flux density is lower than 0.5 [T]. A magnet whose magnetic flux density is lower than 0.5 [T] is not limited to the sintered ferrite magnet of dry type or wet type, a bonded (plastic) magnet with resin binder may be used. The minimum thickness of the sintered ferrite magnet of which diameter is 25 mm is 2 mm in mass production. If the thickness is lower than 2 mm, cracks will occur frequently. The bonded magnet can solve the problem of cracks.

The combination of the two-phase/four-pole stator 10 and the rotor 20 having two sets of rotor units with low-grade permanent magnet whose magnetic flux density is lower than 0.5 [T] can obtain a torque that is equal to or twice as large as a torque of the conventional same-size motor that employs an expensive rare earth magnet such as a neodymium sintered magnet or a samarium cobalt magnet.

Subsequently, four embodiments about the manufacturing method of the stepping motor 1A of the above-mentioned embodiment, especially the magnetizing methods, will be described.

First Embodiment

In the manufacturing method of an HB permanent magnet type electric rotating machine according to the first embodiment of the present invention, the stator 10 is constructed by winding the coils 14 around the main poles 11a of the stator core 11; the rotor 20 is constructed by fixing the first rotor unit 20A, which consists of a pair of rotor cores 21a, 22a and a magnetic material 23a (hereinafter, it is described by the reference 23a that is the same as the permanent magnet after magnetization) sandwiched between the rotor cores, and the second rotor unit 20B, which consists of a pair of rotor cores 21b, 22b and a magnetic material 23b (hereinafter, it is described by the reference 23b that is the same as the permanent magnet after magnetization) sandwiched between the rotor cores; and the rotor 20 is assembled to the stator 10 with a predetermined air gap therebetween so that the rotor 20 is free to rotate by means of the first bracket 12 arranged at the outside of the first rotor unit 20A and the second bracket 13 arranged at the outside of the second rotor unit 20B. With the first bracket 12 arranged on the outside of the first rotor unit 20A, and the second bracket 13 arranged on the outside of the second rotor unit 20B. Thereby, the structure of the stepping motor 1A is completed in the condition that the magnet materials are not magnetized. This condition is called an assembled body.

Subsequently, as shown in FIG. 3, the assembled body is mounted on a magnetizing device 50. The magnetizing device 50 is constituted so as to cover the assembled body. The center axis of the device 50 is coincident with the rotation shaft 30 of the assembled body. The magnetizing device 50 can magnetize the two magnet materials 23a and 23b at one setting and at the same time.

The magnetizing device 50 is provided with a disc-shaped first yoke 51 that is arranged at one side in the axial direction, a disc-shaped second yoke 52 that is arranged at the other side in the axial direction, and a cylindrical third yoke 53 that is arranged between the first and second yokes to cover the circumference. Holes through which the rotation shaft 30 passes are formed on the first and second yokes 51 and 52. The third yoke 53 has an inner flange 53a that is formed inside the cylindrical portion. The half-section of the third yoke 53 shows a T-shape. The inner flange 53a is formed so that the inner surface thereof contacts to the outer circumference of the stator core 11. In the space formed between the first yoke 51 and the inner flange 53a of the third yoke 53, an insulator bobbin 54 is arranged. A first magnetizing coil 55 is wound around the insulator bobbin 54. The insulator bobbin 54 has a step-wise inner circumference so that it faces the first bracket 12 of the assembled body in the axial direction and in the radial direction. Similarly in the space formed between the second yoke 52 and the inner flange 53a of the third yoke 53, an insulator bobbin 56 is arranged. A second magnetizing coil 57 is wound around the insulator bobbin 56. The insulator bobbin 56 has a step-wise inner circumference so that it faces the second bracket 13 of the assembled body in the axial direction and in the radial direction. Each yoke is preferably made from material having high saturation flux density such as pure iron. A yoke may be manufactured by stacking silicon steel plates.

The assembled body is mounted on the above-mentioned magnetizing device 50. And then, when electric currents are supplied to the first and second magnetizing coils 55 and 57, first and second magnetizing paths are formed, and thereby the magnetic materials 23a and 23b are magnetized.

The first magnetizing path connects the portion including the rotation shaft 30 at the side of the first bracket 12 to the outer circumference of the stator core 11 through the first yoke 51 and the third yoke 53 that are positioned outside the assembled body. The magnetizing flux generated by supplying a magnetizing current through the magnetizing coil 55 tries to make a closed loop around the magnetizing coil 55. Therefore, a part of this magnetizing flux from the rotor core 21a goes into the stator core 11 directly without passing magnet material 23a, and returns to the first yoke 51 via the third yoke 53. When the magnetizing flux exceeds the saturation flux density of the rotor core 21b (about 1.5 [T] when it consists of silicon steel plates), a great portion of magnetizing flux passes through the magnet material 23a, reaches the inside rotor core 22a, passes through the stator core 11, and returns to the first yoke 51 via the third yoke 53. Namely, the magnetizing flux passes through the first bracket 12 and the first rotor unit 20A in the axial direction, and passes through the stator core 11 in a direction perpendicular to the axial direction. As a result, the magnetizing flux passes through a half of the assembled body in the axial direction, and thereby the magnet material 23a of the first rotor unit 20A is magnetized in the axial direction.

The second magnetizing path connects the portion including the rotation shaft 30 at the side of the second bracket 13 to the outer circumference of the stator core 11 through the second yoke 52 and the third yoke 53 that are positioned outside the assembled body. A part of the magnetizing flux generated by supplying a magnetizing current through the magnetizing coil 57 goes from the rotor core 21b into the stator core 11 directly without passing magnet material 23b, and returns to the second yoke 52 via the third yoke 53. On the other hand, a great portion of magnetizing flux passes through the magnet material 23b, reaches the inside rotor core 22b, passes through the stator core 11, and returns to the second yoke 52 via the third yoke 53. Namely, the magnetizing flux passes through the second bracket 13 and the second rotor unit 20B in the axial direction, and passes through the stator core 11 in a direction perpendicular to the axial direction. As a result, the magnetizing flux passes through the remaining half of the assembled body in the axial direction, and thereby the magnet material 23b of the second rotor unit 20B is magnetized in the axial direction.

Since the electric current supplied to the first magnetizing coil 55 is opposite in direction to the electric current supplied to the second magnetizing coil 57, the magnet material 23a of the first rotor unit 20A and the magnet material 23b of the second rotor unit 20B are magnetized in the opposite directions to each other with respect to the axial direction.

If the first and second brackets 12, 13 and the bearings 31, 32 were made from magnetic substances, the passing magnetizing flux would become greater. However, in the embodiment, these members are made from nonmagnetic substances such as the aluminum. Therefore, there is a large gap between a yoke and a magnet material. In order that the magnetizing flux fully reaches the magnet material across such a gap, the first and second yokes 51 and 52 have portions extended toward the rotation shaft 30, and the magnetizing coils 55 and 57 are wound around the extended portions. Therefore, the insulator bobbins 54 and 56 are formed so that the sectional shapes thereof have inside steps as shown in FIG. 3.

During the above-mentioned magnetizing process, if a sufficient magnetizing flux is applied to the magnet material 23a of the first rotor unit 20A, a part of the magnetizing flux becomes magnetic flux leakage. And then, if the electric conduction member 24 were not employed, the magnetic flux leakage passes through the rotor core 22b, the magnet material 23b, and the rotor core 21b of the second rotor unit 20B, and the magnet material 23b would be magnetized in the direction opposite to the desired direction. That is, the magnet material 23b would be magnetized in the direction identical to that of the magnet material 23a of the first rotor unit 20A. However, since the electric conduction member 24 is installed between the two rotor units in the assembled body of the first embodiment, when the magnetic flux leakage reaches the electric conduction member 24, the eddy current occurs therein so as to cancel the magnetic flux leakage, which prevents the magnetization of the magnet material 23b of the second rotor unit 20B in the undesirable direction.

In the same manner, when the magnetic flux leakage of the magnetizing flux for the magnet material 23b of the second rotor unit 20B reaches the electric conduction member 24, the eddy current occurs therein so as to cancel the magnetic flux leakage, which prevents the magnetization of the magnet material 23a of the first rotor unit 20A in the undesirable direction.

The manufacturing method of the first embodiment uses the rotor cores 21a, 22a, 21b, 22b and the stator core 11 in addition to the yokes 51, 52, and 53 as the first and second magnetizing paths of the magnetizing device 50. Therefore, the magnetic flux density of the magnetizing flux cannot become larger than the saturation flux density (about 1.5 [T] in case of silicon steel plates) of the rotor core and the stator core. Accordingly, although the magnetizing flux may be too weak to magnetize a sintered neodymium magnet whose residual flux density Br is 1.2 [T], it is sufficient to magnetize a ferrite magnet whose residual flux density Br is 0.5 [T]. Therefore, the magnetizing device 50 used in the first embodiment is suitable for the targeted stepping motor 1A that employs a permanent magnet such as a ferrite magnet or a bonded magnet whose residual flux density is similar to that of the ferrite magnet.

The magnet material 23a of the first rotor unit 20A and the magnet material 23b of the second rotor unit 20B may be magnetized simultaneously, or may be magnetized one by one with time difference. Anyway, electric currents are supplied to the magnetizing coils 55 and 57 so that appropriate magnetizing fluxes flow through the respective magnetizing paths. According to the first embodiment, since the permanent magnets can be magnetized after the rotor 20 of the stepping motor 1A is assembled to the stator 10, there is no magnetic force during the assembling. Therefore, the assembling is easy because the rotor is not attracted by the stator, and the reliability of the completed motor is improved because the rotor does not attract iron powder or dust during the assembling.

In the above-mentioned magnetizing device 50, the third yoke 53 is formed as a single-piece construction. However, the third yoke 53 may be formed as a combination of two members (right and left members in FIG. 3) that are obtained by dividing the third yoke 53 by a plane perpendicular to the rotation shaft 30. In this case, each yoke is preferably made from pure iron.

Second Embodiment

In the manufacturing method of an HB permanent magnet type electric rotating machine according to the second embodiment of the present invention, a constructed rotor is mounted on a magnetizing device to magnetize magnet materials that constitute permanent magnets of the rotor before the rotor is assembled to a stator.

Namely, as shown in FIG. 4, the rotor 20 is constructed by fixing the first rotor unit 20A, which consists of a pair of rotor cores 21a, 22a and a magnetic material 23a sandwiched between the rotor cores, and the second rotor unit 20B, which consists of a pair of rotor cores 21b, 22b and a magnetic material 23b sandwiched between the rotor cores to the rotation shaft 30. Then, the rotor 20 is mounted on the magnetizing device 60, and the magnet materials 23a and 23b are magnetized to be permanent magnets.

The magnetizing device 60 of the second embodiment is provided with a cylindrical first yoke 61 that is arranged at one side in the axial direction, a cylindrical second yoke 62 that is arranged at the other side in the axial direction, a third yoke 63 that surrounds the first yoke 61, and a fourth yoke 64 that surrounds the second yoke 62. Holes through which the rotation shaft 30 passes are formed on the first and second yokes 61 and 62. The half-sections of the third and fourth yokes 63 and 64 show U-shapes, respectively. In the ring-shaped space formed between the first yoke 61 and the third yoke 63, an insulator bobbin 65 is arranged. A first magnetizing coil 66 is wound around the insulator bobbin 65. Similarly in the ring-shaped space formed between the second yoke 62 and the fourth yoke 64, an insulator bobbin 67 is arranged. A second magnetizing coil 68 is wound around the insulator bobbin 67.

The first yoke 61 has a step-wise inner surface so as to surround the rotation shaft 30 and the bearing 31 and to contact to the rotor core 21a of the first rotor unit 20A in the axial direction. Similarly, the second yoke 62 has a step-wise inner surface so as to surround the rotation shaft 30 and the bearing 32 and to contact to the rotor core 21b of the second rotor unit 20B in the axial direction.

The third yoke 63 is absolutely contact with the first yoke 61 at the end in the axial direction and contacts to the outer circumference of the inside rotor core 22a of the first rotor unit 20A at the center side. The third yoke may face to the rotor core 22a via a small air gap. Similarly, the fourth yoke 64 is absolutely contact with the second yoke 62 at the end in the axial direction and contacts to the outer circumference of the inside rotor core 22b of the second rotor unit 20B at the center side. The fourth yoke 64 may face to the rotor core 22b via a small air gap. Each yoke is preferably made from pure iron.

The rotor 20 is mounted on the above-mentioned magnetizing device 60. And then, when electric currents are supplied to the first and second magnetizing coils 66 and 68, first and second magnetizing paths are formed, and thereby the magnetic materials are magnetized.

The first magnetizing path connects the portion including the side surface of the outside rotor core 21a to the outer circumference of the inside rotor core 22a of the first rotor unit 20A through the first yoke 61 and the third yoke 63 that are positioned outside the rotor 20. The magnetizing flux generated by supplying the magnetizing current through the magnetizing coil 66 passes through the outside rotor core 21a and the magnet material 23a of the first rotor unit 20A in the axial direction and then reaches the inside rotor core 22a. And then, the magnetizing flux returns to the first yoke 61 through the third yoke 63. Thereby, the magnet material 23a of the first rotor unit 20A is magnetized in the axial direction.

The second magnetizing path connects the portion including the side surface of the outside rotor core 21b to the outer circumference of the inside rotor core 22b of the second rotor unit 20B through the second yoke 62 and the fourth yoke 64 that are positioned outside the rotor 20. The magnetizing flux generated by supplying the magnetizing current through the magnetizing coil 68 passes through the outside rotor core 21b and the magnet material 23b of the second rotor unit 20B in the axial direction and reaches the inside rotor core 22b. And then, the magnetizing flux returns to the second yoke 62 through the fourth yoke 64. Thereby, the magnet material 23b of the second rotor unit 20B is magnetized in the axial direction.

Since the electric current supplied to the first magnetizing coil 66 is opposite in direction to the electric current supplied to the second magnetizing coil 68, the magnet material 23a of the first rotor unit 20A and the magnet material 23b of the second rotor unit 20B are magnetized in the opposite directions to each other with respect to the axial direction. Since the electric conduction member 24 is installed, the magnetic flux leakage is cancelled by the eddy current generated in the electric conduction member 24, which prevents the magnet materials 23a and 23b from being magnetized in the undesirable direction.

The magnet material 23a of the first rotor unit 20A and the magnet material 23b of the second rotor unit 20B may be magnetized simultaneously, or may be magnetized one by one with time difference. Anyway, electric currents are supplied to the magnetizing coils 66 and 68 so that appropriate magnetizing fluxes flow through the respective magnetizing paths.

When the magnet materials are magnetized under the condition where the rotor is assembled to the stator as described in the first embodiment, since the non magnetic materials such as a bracket, a bearing, a stator core are included in the magnetizing path, the gap may be too large to sufficiently magnetize the permanent magnet whose residual flux density is about 1.2 [T] such as a sintered neodymium magnet. Since the method of the second embodiment magnetizes the magnet materials before assembling the rotor to the stator, the magnetizing path does not include the bracket, the stator core, or the like. Therefore, the gap is small. Since the saturation flux density of the yokes made from pure iron is about 2.2 [T], the magnetic flux density that is sufficient to magnetize the permanent magnets such as a sintered neodymium magnet can be acquired.

After the magnet materials are magnetized by the magnetizing device 60, the rotor 20 is assembled to the stator 10 with a predetermined air gap therebetween so that the rotor 20 is free to rotate by means of the first bracket 12 arranged at the outside of the first rotor unit 20A and the second bracket 13 arranged at the outside of the second rotor unit 20B. Thereby, the stepping motor 1A is completed.

If the magnetic materials are magnetized before the bearings 31 and 32 are attached to the rotation shaft 30, the contact areas of the first and third yokes 61 and 63 to the rotor cores 21a and 21b increase, the magnetizing becomes easier.

Third Embodiment

In the manufacturing method of an HB permanent magnet type electric rotating machine according to the third embodiment of the present invention, the magnet materials are magnetized after the rotor is assembled to the stator. That is identical to the first embodiment. However, the method of the third embodiment uses a magnetizing device 70 shown in FIG. 5 instead of the magnetizing device 50 used in the first embodiment.

Namely, the stator 10 is constructed by winding the coils 14 around the main poles 11a of the stator core 11; the rotor 20 is constructed by fixing the first rotor unit 20A, which consists of a pair of rotor cores 21a, 22a and a magnetic material 23a sandwiched between the rotor cores, and the second rotor unit 20B, which consists of a pair of rotor cores 21b, 22b and a magnetic material 23b sandwiched between the rotor cores to the rotation shaft 30; and the rotor 20 is assembled to the stator 10 with a predetermined air gap therebetween so that the rotor 20 is free to rotate by means of the first bracket 12 arranged at the outside of the first rotor unit 20A and the second bracket 13 arranged at the outside of the second rotor unit 20B. Thereby, the structure of the stepping motor 1A is completed in the condition that the magnet materials are not magnetized. This condition is called an assembled body.

Subsequently, the assembled body is mounted on the magnetizing device 70 as shown in FIG. 5. The magnetizing device 70 is constituted so as to cover a half of the assembled body in the axial direction. The center axis of the device 70 is coincident with the rotation shaft 30 of the assembled body. The magnetizing device 70 can magnetize one of the two magnet materials 23a and 23b at one setting. In the condition shown in FIG. 5, the magnet material 23a can be magnetized. After magnetizing the magnet material 23a of the first rotor unit 20A in the illustrated condition, the assembled body is removed from the magnetizing device 70, and is reset to the magnetizing device 70 in a reversed orientation in the axial direction. Then, the magnet material 23b of the second rotor unit 20B is magnetized.

The magnetizing device 70 is provided with a disc-shaped first yoke 71 and a second yoke 72 that covers the outer circumference of the first yoke 71. A hole through which the rotation shaft 30 passes is formed on the first yoke 71. The half-section of the second yoke 72 shows an L-shape so as to contact to the rotor core 11. In the space formed between the first yoke 71 and the second yoke 72, an insulator bobbin 73 is arranged. A first magnetizing coil 74 is wound around the insulator bobbin 73. The insulator bobbin 73 has a step-wise inner circumference so as to face the first bracket 12 of the assembled body in the axial direction and in the radial direction. The magnetizing device 70 of the third embodiment is basically identical to the half portion in the axial direction that is removed from the magnetizing device 50 of the first embodiment shown in FIG. 3. However, the thickness of the part of the second yoke 72 that contacts to the stator core 11 is enlarged to cover the thickness of the stator core 11. Each yoke is preferably made from pure iron.

The half of the assembled body at the side of the first rotor unit 20A is mounted on the above-mentioned magnetizing device 70. And then, when an electric current is supplied to the magnetizing coil 74, a first magnetizing path is formed, and thereby the magnetic material 23a of the first rotor unit 20A is magnetized.

The first magnetizing path connects the portion including the rotation shaft 30 at the side of the first bracket 12 to the outer circumference of the stator core 11 through the first yoke 71 and the second yoke 72 that are positioned outside the assembled body. The magnetizing flux generated by supplying the magnetizing current through the magnetizing coil 74 passes through the outside rotor core 21a and the magnet material 23a, and reaches the inside rotor core 22a. And then, the magnetizing flux passes through the stator core 11 and returns to the first yoke 71 through the second yoke 72. Namely, the magnetizing flux passes through the first bracket 12 and the first rotor unit 20A in the axial direction, and passes through the stator core 11 in the direction perpendicular to the rotation shaft 30. As a result, the magnetizing flux passes through a half of the assembled body in the axial direction, and thereby the magnet material 23a of the first rotor unit 20A is magnetized in the axial direction.

Next, the assembled body is removed from the magnetizing device 70, and is reset to the magnetizing device 70 in the reverse orientation in the axial direction. That is, the half of the assembled body at the side of the second rotor unit 20B is mounted on the magnetizing device 70. And then, when an electric current is supplied to the magnetizing coil 74, a second magnetizing path is formed, and thereby the magnetic material 23b of the second rotor unit 20B is magnetized.

The second magnetizing path connects the portion including the rotation shaft 30 at the side of the second bracket 13 to the outer circumference of the stator core 11 through the first yoke 71 and the second yoke 72 that are positioned outside the assembled body. The magnetizing flux generated by supplying the magnetizing current through the magnetizing coil 74 passes through the outside rotor core 21b and the magnet material 23b, and reaches the inside rotor core 22b. And then, the magnetizing flux passes through the stator core 11 and returns to the first yoke 71 through the second yoke 72. Namely, the magnetizing flux passes through the second bracket 13 and the second rotor unit 20B in the axial direction, and passes through the stator core 11 in the direction perpendicular to the rotation shaft 30. As a result, the magnetizing flux passes through a half of the assembled body in the axial direction, and thereby the magnet material 23b of the second rotor unit 20B is magnetized in the axial direction.

Since the orientation of the assembled body is reversed in the axial direction when the setting is changed, the magnet material 23a of the first rotor unit 20A and the magnet material 23b of the second rotor unit 20B are magnetized in the opposite directions to each other with respect to the axial direction, even if the direction of the electric current in the magnetizing coil 74 is not changed. Since the electric conduction member 24 is installed, the magnetic flux leakage is cancelled by the eddy current generated in the electric conduction member 24, which prevents the magnet materials 23a and 23b from being magnetized in the undesirable direction.

Although the magnetizing process using the magnetizing device 70 of the third embodiment takes time for magnetization, the size of the device becomes smaller than that of the first embodiment shown in FIG. 3. Further, since the thickness of the part of the second yoke 72 that contacts to the stator core 11 can be determined in consideration of one magnet material as a target, the thickness can be optimized in accordance with properties and thickness of the stator core 11. That is, since the inner flange 53a of the third yoke 53 in the magnetizing device 50 of FIG. 3 is used as a common magnetic path to magnetize both of the magnetic materials 23a and 23b, the maximum thickness in the axial direction used for one magnet material is ½ of the thickness of the stator core. On the other hand, since the magnetizing device 70 shown in FIG. 5 magnetizes both of the magnet materials one by one with the one coil, the thickness of the part of the second yoke 72 that contacts to the stator core 11 in the axial direction used for one magnetic material is not limited like the device shown in FIG. 3. Therefore, the thickness used for one magnetic material can be as thick as the stator core 11. Therefore, the thickness of the yoke can be determined so that it has appropriate magnetic resistance based on the required magnetic flux density according to the properties of the magnetic material.

Fourth Embodiment

In the manufacturing method of an HB permanent magnet type electric rotating machine according to the fourth embodiment of the present invention, the magnet materials are magnetized before the rotor is assembled to the stator. That is identical to the second embodiment. However, the method of the fourth embodiment uses a magnetizing device 80 shown in FIG. 6 instead of the magnetizing device 60 used in the second embodiment.

Namely, the rotor 20 is constructed by fixing the first rotor unit 20A, which consists of a pair of rotor cores 21a, 22a and a magnetic material 23a sandwiched between the rotor cores, and the second rotor unit 20B, which consists of a pair of rotor cores 21b, 22b and a magnetic material 23b sandwiched between the rotor cores to the rotation shaft 30. Then, the rotor 20 is mounted on the magnetizing device 80, and the magnet materials 23a and 23b are magnetized to be permanent magnets.

The magnetizing device 80 of the fourth embodiment is constituted so as to cover a half of the rotor 20 in the axial direction. The center axis of the device 80 is coincident with the rotation shaft 30. The magnetizing device 80 can magnetize one of the two magnet materials 23a and 23b at one setting. In the condition shown in FIG. 6, the magnet material 23a can be magnetized. After magnetizing the magnet material 23a of the first rotor unit 20A in the illustrated condition, the rotor 20 is removed from the magnetizing device 80, and is reset to the magnetizing device 80 in a reversed orientation in the axial direction. Then, the magnet material 23b of the second rotor unit 20B is magnetized.

The magnetizing device 80 of the fourth embodiment is identical to the half portion in the axial direction that is removed from the magnetizing device 60 of the second embodiment shown in FIG. 4. That is, the magnetizing device 80 is provided with a cylindrical first yoke 81 and a second yoke 82 that surrounds the first yoke 81. A hole through which the rotation shaft 30 passes is formed on the first yoke 81. The half-section of the second yoke 82 show a U-shape. In the ring-shaped space formed between the first yoke 81 and the second yoke 82, an insulator bobbin 83 is arranged. A magnetizing coil 84 is wound around the insulator bobbin 83.

The first yoke 81 has a step-wise inner surface so as to surround the rotation shaft 30 and the bearing 31 and to contact to the rotor core 21a of the first rotor unit 20A in the axial direction. The second yoke 82 is absolutely contact with the first yoke 81 at the end in the axial direction and contacts to the outer circumference of the inside rotor core 22a of the first rotor unit 20A at the center side. The second yoke may face to the rotor core 22a via a small air gap. Each yoke is preferably made from pure iron.

The half of the rotor 20 at the side of the first rotor unit 20A is mounted on the above-mentioned magnetizing device 80. And then, when an electric current is supplied to the magnetizing coil 84, a first magnetizing path is formed, and thereby the magnetic material 23a of the first rotor unit 20A is magnetized.

The first magnetizing path connects the portion including the side surface of the outside rotor core 21a to the outer circumference of the inside rotor core 22a of the first rotor unit 20A through the first yoke 81 and the second yoke 82 that are positioned outside the rotor 20. The magnetizing flux generated by supplying the magnetizing current through the magnetizing coil 84 passes through the outside rotor core 21a and the magnet material 23a of the first rotor unit 20A in the axial direction and then reaches the inside rotor core 22a. And then, the magnetizing flux returns to the first yoke 81 through the second yoke 82. Thereby, the magnet material 23a of the first rotor unit 20A is magnetized in the axial direction.

Next, the rotor 20 is removed from the magnetizing device 80, and is reset to the magnetizing device 80 in the reverse orientation in the axial direction. That is, the half of the rotor 20 at the side of the second rotor unit 20B is mounted on the magnetizing device 80. And then, when an electric current is supplied to the magnetizing coil 84, a second magnetizing path is formed, and thereby the magnetic material 23b of the second rotor unit 20B is magnetized.

The second magnetizing path connects the portion including the side surface of the outside rotor core 21b to the outer circumference of the inside rotor core 22b of the second rotor unit 20B through the first yoke 81 and the second yoke 82 that are positioned outside the rotor 20. The magnetizing flux generated by supplying the magnetizing current through the magnetizing coil 84 passes through the outside rotor core 21b and the magnet material 23b of the second rotor unit 20B in the axial direction and reaches the inside rotor core 22b. And then, the magnetizing flux returns to the first yoke 81 through the second yoke 82. Thereby, the magnet material 23b of the second rotor unit 20B is magnetized in the axial direction.

Since the orientation of the rotor 20 is reversed in the axial direction when the setting is changed, the magnet material 23a of the first rotor unit 20A and the magnet material 23b of the second rotor unit 20B are magnetized in the opposite directions to each other with respect to the axial direction, even if the direction of the electric current in the magnetizing coil 84 is not changed. Since the electric conduction member 24 is installed, the magnetic flux leakage is cancelled by the eddy current generated in the electric conduction member 24, which prevents the magnet materials 23a and 23b from being magnetized in the undesirable direction.

After the magnet materials are magnetized by the magnetizing device 80, the rotor 20 is assembled to the stator 10 with a predetermined air gap therebetween so that the rotor 20 is free to rotate by means of the first bracket 12 and the second bracket 13. Thereby, the stepping motor 1A is completed.

Next, the configuration of the HB permanent magnet type electric rotating machine (a stepping motor) to which the manufacturing methods of the fifth embodiment through the ninth embodiment are applied will be described based on FIG. 7. FIG. 7 is a longitudinal sectional view of the stepping motor 1B. The stepping motor 1B has the same basic configuration as that disclosed in U.S. Pat. No. 6,781,260. Since the front view is the same as FIG. 2, illustration is omitted.

The stepping motor 1B is an inner rotor HB type stepping motor constituted by arranging a HB type rotor 20C into a stator 10 that consists of magnetic substance of four-pole structure. A configuration of the rotor 20C is different from the rotor 20 of the stepping motor 1A shown in FIG. 1. That is, the rotor 20C of the stepping motor 1B is constructed by fixing a first rotor core 21a, a permanent magnet 23a, a second rotor core 22, a permanent magnet 23b, and a third rotor core 21b to a rotation shaft 30 in this order from left side in FIG. 7. The rotor cores and permanent magnets are arranged without gaps. The thickness of the first rotor core 21a is identical to that of the third rotor core 21b, and the thickness of the second rotor core 22 is twice the thickness of the first rotor core 21a. A plurality of small teeth are formed on the circumference of each rotor core in the same manner as shown in FIG. 2.

The respective elements of the above-mentioned rotor can be divided into two set of rotor units. That is, the first rotor unit is constructed by sandwiching the permanent magnet 23a between the first rotor core 21a and an axial half of the second rotor core 22. The second rotor unit is constructed by sandwiching the permanent magnet 23b between the third rotor core 21b and the remaining axial half of the second rotor core 22. The rotor core 20C does not include the electric conduction material 24 that is arranged in the stepping motor 1A of FIG. 1. The other configurations are the same as that of the stepping motor 1A of FIG. 1.

Since the stepping motor 1B of FIG. 7 has two sets of rotor units as with the stepping motor 1A of FIG. 1, it can erase unbalance electromagnetic force in the radial direction that generates by the combination of the four-pole stator and the conventional HB type rotor that has an only one rotor unit. Further, the stepping motor 1B can produce a high torque even if it employs a magnet with low residual flux density such as a ferrite magnet and a bonded magnet.

Fifth Embodiment

In the manufacturing method of an HB permanent magnet type electric rotating machine according to the fifth embodiment of the present invention, the stator 10 is constructed by winding the coils 14 around the stator core 11; the rotor 20C is constructed by fixing the rotor cores 21a, 22, and 21b and the magnet materials 23a and 23b to the rotor shaft 30; and the rotor 20C is assembled to the stator 10 with a predetermined air gap therebetween so that the rotor 20 is free to rotate by means of the first bracket 12 and the second bracket 13. Thereby, the structure of the stepping motor 1B is completed in the condition that the magnet materials are not magnetized. This condition is called an assembled body.

Subsequently, as shown in FIG. 8, the assembled body is mounted on the magnetizing device 50. The magnetizing device 50 is the same as that shown in FIG. 3. The assembled body is mounted on the magnetizing device 50. And then, when electric currents are supplied to the first and second magnetizing coils 55 and 57, first and second magnetizing paths are formed, and thereby the magnetic materials 23a and 23b are magnetized.

The first magnetizing path connects the portion including the rotation shaft 30 at the side of the first bracket 12 to the outer circumference of the stator core 11 through the first yoke 51 and the third yoke 53 that are positioned outside the assembled body. The magnetizing flux generated by supplying a magnetizing current through the magnetizing coil 55 passes through the first rotor core 21a and the magnet material 23a, reaches the second rotor core 22, passes through the stator core 11, and returns to the first yoke 51 via the third yoke 53. Thereby, the magnet material 23a of the first rotor unit is magnetized in the axial direction.

The second magnetizing path connects the portion including the rotation shaft 30 at the side of the second bracket 13 to the outer circumference of the stator core 11 through the second yoke 52 and the third yoke 53 that are positioned outside the assembled body. The magnetizing flux generated by supplying a magnetizing current through the magnetizing coil 57 passes through the third rotor core 21b and the magnet material 23b, reaches the second rotor core 22, passes through the stator core 11, and returns to the second yoke 52 via the third yoke 53. Thereby, the magnet material 23b of the second rotor unit is magnetized in the axial direction.

Since the electric current supplied to the first magnetizing coil 55 is opposite in direction to the electric current supplied to the second magnetizing coil 57, the magnet material 23a of the first rotor unit and the magnet material 23b of the second rotor unit are magnetized in the opposite directions to each other with respect to the axial direction.

Sixth Embodiment

In the manufacturing method of an HB permanent magnet type electric rotating machine according to the sixth embodiment of the present invention, the stator 10 is constructed by winding the coils 14 around the stator core 11; the rotor 20C is constructed by fixing the rotor cores 21*a*, 22, and 21*b* and the magnet materials 23*a* and 23*b* to the rotor shaft 30; and the rotor 20C is mounted on the magnetizing device 60 as shown in FIG. 9 to magnetize the magnetic materials to be permanent magnets before the rotor 20C is assembled to the stator 10.

The magnetizing device 60 is the same as that shown in FIG. 4. The rotor 20C is mounted on the above-mentioned magnetizing device 60. And then, when electric currents are supplied to the first and second magnetizing coils 66 and 68, first and second magnetizing paths are formed, and thereby the magnet materials 23*a* and 23*b* are magnetized.

The first magnetizing path connects the portion including the side surface of the first rotor core 21*a* to the outer circumference of the second rotor core 22 through the first yoke 61 and the third yoke 63 that are positioned outside the rotor 20C. The magnetizing flux generated by supplying the magnetizing current through the magnetizing coil 66 passes through the first rotor core 21*a* and the magnet material 23*a* in the axial direction and then reaches the second rotor core 22. And then, the magnetizing flux returns to the first yoke 61 through the third yoke 63. Thereby, the magnet material 23*a* of the first rotor unit is magnetized in the axial direction.

The second magnetizing path connects the portion including the side surface of the third rotor core 21*b* to the outer circumference of the second rotor core 22 through the second yoke 62 and the fourth yoke 64 that are positioned outside the rotor 20C. The magnetizing flux generated by supplying the magnetizing current through the magnetizing coil 68 passes through the third rotor core 21*b* and the magnet material 23*b* in the axial direction and reaches the second rotor core 22. And then, the magnetizing flux returns to the second yoke 62 through the fourth yoke 64. Thereby, the magnet material 23*b* of the second rotor unit is magnetized in the axial direction.

Since the electric current supplied to the first magnetizing coil 66 is opposite in direction to the electric current supplied to the second magnetizing coil 68, the magnet material 23*a* of the first rotor unit and the magnet material 23*b* of the second rotor unit are magnetized in the opposite directions to each other with respect to the axial direction.

After the magnet materials are magnetized by the magnetizing device 60, the rotor 20C is assembled to the stator 10 with a predetermined air gap therebetween so that the rotor 20C is free to rotate by means of the first bracket 12 and the second bracket 13. Thereby, the stepping motor 1B is completed.

If the magnetic materials are magnetized before the bearings 31 and 32 are attached to the rotation shaft 30, the contact areas of the first and third yokes 61 and 63 to the rotor cores 21*a* and 21*b* increase, the magnetizing becomes easier.

Seventh Embodiment

In the manufacturing method of an HB permanent magnet type electric rotating machine according to the seventh embodiment of the present invention, the stator 10 is constructed by winding the coils 14 around the stator core 11; the rotor 20C is constructed by fixing the rotor cores 21*a*, 22, and 21*b* and the magnet materials 23*a* and 23*b* to the rotor shaft 30; and the rotor 20C is assembled to the stator 10 with a predetermined air gap therebetween so that the rotor 20C is free to rotate by means of the first bracket 12 and the second bracket 13. Thereby, the structure of the stepping motor 1B is completed in the condition that the magnet materials are not magnetized. This condition is called an assembled body.

Subsequently, as shown in FIG. 10, the assembled body is mounted on the magnetizing device 70. The magnetizing device 70 is the same as that shown in FIG. 5. The half of the assembled body at the side of the first rotor core 21*a* is mounted on the magnetizing device 70. And then, when an electric current is supplied to the magnetizing coil 74, a first magnetizing path is formed, and thereby the magnetic material 23*a* of the first rotor unit is magnetized.

The first magnetizing path connects the portion including the rotation shaft 30 at the side of the first bracket 12 to the outer circumference of the stator core 11 through the first yoke 71 and the second yoke 72 that are positioned outside the assembled body. The magnetizing flux generated by supplying the magnetizing current through the magnetizing coil 74 passes through the first rotor core 21*a* and the magnet material 23*a*, and reaches the second rotor core 22. And then, the magnetizing flux passes through the stator core 11 and returns to the first yoke 71 through the second yoke 72. Thereby, the magnet material 23*a* of the first rotor unit is magnetized in the axial direction.

Next, the assembled body is removed from the magnetizing device 70, and is reset to the magnetizing device 70 in the reverse orientation in the axial direction. That is, the half of the assembled body at the side of the third rotor core 21*b* is mounted on the magnetizing device 70. And then, when an electric current is supplied to the magnetizing coil 74, a second magnetizing path is formed, and thereby the magnetic material 23*b* of the second rotor unit is magnetized.

The second magnetizing path connects the portion including the rotation shaft 30 at the side of the second bracket 13 to the outer circumference of the stator core 11 through the first yoke 71 and the second yoke 72 that are positioned outside the assembled body. The magnetizing flux generated by supplying the magnetizing current through the magnetizing coil 74 passes through the third rotor core 21*b* and the magnet material 23*b*, and reaches the second rotor core 22. And then, the magnetizing flux passes through the stator core 11 and returns to the first yoke 71 through the second yoke 72. Thereby, the magnet material 23*b* of the second rotor unit is magnetized in the axial direction.

Since the orientation of the assembled body is reversed in the axial direction when the setting is changed, the magnet material 23*a* of the first rotor unit and the magnet material 23*b* of the second rotor unit are magnetized in the opposite directions to each other with respect to the axial direction, even if the direction of the electric current in the magnetizing coil 74 is not changed.

Eighth Embodiment

In the manufacturing method of an HB permanent magnet type electric rotating machine according to the eighth embodiment of the present invention, the stator 10 is constructed by winding the coils 14 around the stator core 11; the rotor 20C is constructed by fixing the rotor cores 21*a*, 22, and 21*b* and the magnet materials 23*a* and 23*b* to the rotor shaft 30; and the rotor 20C is mounted on the magnetizing device 80 as shown in FIG. 11 to magnetize the magnetic materials to be permanent magnets before the rotor 20C is assembled to the stator 10.

The magnetizing device 80 is the same as that shown in FIG. 6. The half of the rotor 20 at the side of the first rotor unit 20A is mounted on the above-mentioned magnetizing device 80. And then, when an electric current is supplied to the magnetizing coil 84, a first magnetizing path is formed, and thereby the magnetic material 23a of the first rotor unit 20A is magnetized.

The first magnetizing path connects the portion including the side surface of the first rotor core 21a to the outer circumference of the second rotor core 22 through the first yoke 81 and the second yoke 82 that are positioned outside the rotor 20C. The magnetizing flux generated by supplying the magnetizing current through the magnetizing coil 84 passes through the first rotor core 21a and the magnet material 23a in the axial direction and then reaches the second rotor core 22. And then, the magnetizing flux returns to the first yoke 81 through the second yoke 82. Thereby, the magnet material 23a of the first rotor unit is magnetized in the axial direction.

Next, the rotor 20C is removed from the magnetizing device 80, and is reset to the magnetizing device 80 in the reverse orientation in the axial direction. That is, the half of the rotor 20C at the side of the third rotor core 21b is mounted on the magnetizing device 80. And then, when an electric current is supplied to the magnetizing coil 84, a second magnetizing path is formed, and thereby the magnetic material 23b of the second rotor unit is magnetized.

The second magnetizing path connects the portion including the side surface of the third rotor core 21b to the outer circumference of the second rotor core 22 through the first yoke 81 and the second yoke 82 that are positioned outside the rotor 20C. The magnetizing flux generated by supplying the magnetizing current through the magnetizing coil 84 passes through the third rotor core 21b and the magnet material 23b in the axial direction and reaches the second rotor core 22. And then, the magnetizing flux returns to the first yoke 81 through the second yoke 82. Thereby, the magnet material 23b of the second rotor unit is magnetized in the axial direction.

Since the orientation of the rotor 20C is reversed in the axial direction when the setting is changed, the magnet material 23a of the first rotor unit and the magnet material 23b of the second rotor unit are magnetized in the opposite directions to each other with respect to the axial direction, even if the direction of the electric current in the magnetizing coil 74 is not changed.

After the magnet materials are magnetized by the magnetizing device 80, the rotor 20C is assembled to the stator 10 with a predetermined air gap therebetween so that the rotor 20C is free to rotate by means of the first bracket 12 and the second bracket 13. Thereby, the stepping motor 1B is completed.

If the magnetic materials are magnetized before the bearings 31 and 32 are attached to the rotation shaft 30, the contact areas of the first yoke 81 to the rotor cores 21a and 21b increase, the magnetizing becomes easier.

Ninth Embodiment

In the manufacturing method of an HB permanent magnet type electric rotating machine according to the ninth embodiment of the present invention, the stator 10 is constructed by winding the coils 14 around the stator core 11; the rotor 20C is constructed by fixing the rotor cores 21a, 22, and 21b and the magnet materials 23a and 23b to the rotor shaft 30; and the rotor 20C is assembled to the stator 10 with a predetermined air gap therebetween so that the rotor 20C is free to rotate by means of the first bracket 12 and the second bracket 13. Thereby, the structure of the stepping motor 1B is completed in the condition that the magnet materials are not magnetized. This condition is called an assembled body.

Subsequently, as shown in FIG. 12, the assembled body is mounted on a magnetizing device 90. The magnetizing device 90 is constituted so as to cover a half of the assembled body in the axial direction. The center axis of the device 90 is coincident with the rotation shaft 30 of the assembled body. The magnetizing device 90 can magnetize one of the two magnet materials 23a and 23b at one setting. In the condition shown in FIG. 12, the magnet material 23a can be magnetized. After magnetizing the magnet material 23a in the illustrated condition, the assembled body is removed from the magnetizing device 90, and is reset to the magnetizing device 70 in a reversed orientation in the axial direction. Then, the magnet material 23b is magnetized.

The magnetizing device 90 is provided with a disc-shaped first yoke 91 and a cylindrical second yoke 92 that covers the outer circumference of the first yoke 91. A hole through which the rotation shaft 30 passes is formed on the first yoke 91. As shown in FIG. 13, eight main poles 92a are radially formed from the cylinder potion of the second yoke 92. An insulator bobbin 93 is attached to each main pole, and a magnetizing coil 74 is wound around each the insulator bobbin 93. The eight main poles 92a are formed so as to contact to the circumference of the stator core 11. Although the magnetizing device 90 shown in FIG. 13 has eight main poles around which the magnetizing coils are wound, the number of the main poles can be selected in accordance with a motor shape. For example, a magnetizing device with four main poles is desirable when a motor shape is square. Each yoke is preferably made from pure iron.

The half of the assembled body at the side of the first rotor core 21a is mounted on the magnetizing device 90. And then, when an electric current is supplied to the magnetizing coils 94, a first magnetizing path is formed, and thereby the magnetic material 23a of the first rotor unit is magnetized.

The first magnetizing path connects the portion including the rotation shaft 30 at the side of the first bracket 12 to the outer circumference of the stator core 11 through the first yoke 91 and the second yoke 92 that are positioned outside the assembled body. The magnetizing flux generated by supplying the magnetizing current through the magnetizing coils 94 passes through the second yoke 92, the first yoke 91, the first rotor core 21a, and the magnet material 23a, and reaches the second rotor core 22. And then, the magnetizing flux passes through the stator core 11 and returns to the second yoke 92. Thereby, the magnet material 23a of the first rotor unit is magnetized in the axial direction.

Next, the assembled body is removed from the magnetizing device 90, and is reset to the magnetizing device 90 in the reverse orientation in the axial direction. That is, the half of the assembled body at the side of the third rotor core 21b is mounted on the magnetizing device 90. And then, when an electric current is supplied to the magnetizing coils 94, a second magnetizing path is formed, and thereby the magnetic material 23b of the second rotor unit is magnetized.

The second magnetizing path connects the portion including the rotation shaft 30 at the side of the second bracket 13 to the outer circumference of the stator core 11 through the first yoke 91 and the second yoke 92 that are positioned outside the assembled body. The magnetizing flux generated by supplying the magnetizing current through the magnetizing coils 94 passes through the second yoke 92, the first yoke 91, the third rotor core 21b and the magnet material 23b, and reaches the second rotor core 22. And then, the magnetizing flux passes through the stator core 11 and returns to the second yoke 92.

Thereby, the magnet material 23*b* of the second rotor unit is magnetized in the axial direction.

Since the orientation of the assembled body is reversed in the axial direction when the setting is changed, the magnet material 23*a* of the first rotor unit and the magnet material 23*b* of the second rotor unit are magnetized in the opposite directions to each other with respect to the axial direction, even if the direction of the electric current in the magnetizing coils 94 is not changed.

In the magnetizing devices of the first embodiment through the eighth embodiment, the magnetizing coils are wound as rings whose center axes are coincident with the rotation shaft. On the other hand, the magnetizing coils 94 of the ninth embodiment are wound around the radial main poles that are perpendicular to the rotation shaft. The magnetizing device 90 of the ninth embodiment may be provided with the ring coil, which is used in another embodiment, in addition to the magnetizing coils 94. In such a case, the ring coil is connected to the magnetizing coils 94 in series or in parallel.

Since an electric rotating machine manufactured by the manufacturing method of the present invention has a high torque with low cost, it is suitable to OA equipment such as a copier and a printer. Further, since the electric rotating machine can increase an air gap between a stator and a rotor, it becomes a low-vibration actuator, which is expected to have a large industrial contribution. In addition, the applications to medical equipment, FA equipment, robots, game machines, and housing equipment are also expected.

In the above-mentioned embodiments, the sectional shape of the stator core is approximately quadrangle. However, it may be other polygons, for example, hexagon, and octagons, and may be annular.

The embodiments are described assuming that a target is an inner rotor type stepping motor. However, the method of the present invention can be also applied to manufacture an outer rotor type stepping motor. When a magnetic material of an outer rotor type stepping motor is magnetized after a rotor is assembled to a stator, a magnetizing path is formed between an end surface of a rotor that is perpendicular to a rotation shaft and an outer circumference of the rotor that is parallel to the rotation shaft. Since the magnet material is located at the outer circumference side in the rotor, the magnetizing path does not include the stator, the magnetic material can be intensely magnetized even if it is magnetized after assembling as a motor.

What is claimed is:

1. A manufacturing method of a hybrid permanent magnet type electric rotating machine, the method comprising:

constructing a stator by winding excitation coils around respective main poles, and by forming a plurality of inductors on a tip portion of each of said main poles;

constructing a rotor by fixing a first rotor unit, which includes a pair of rotor cores arranged with deviation of ½ a pitch of small teeth formed around said rotor cores in a circumferential direction and a magnetic magnet material sandwiched between said rotor cores, and a second rotor unit, which has a same construction as said first rotor unit, to a common rotation shaft so that positions of the small teeth of the adjacent rotor cores of said first and second rotor units are identical;

assembling said rotor to said stator with a predetermined air gap therebetween to make an assembled body so that said rotor is free to rotate by means of a first bracket arranged at an outside of said first rotor unit and a second bracket arranged at an outside of said second rotor unit;

magnetizing said magnet material of said first rotor unit in an axial direction by a magnetizing flux passing through said first bracket and said first rotor unit in the axial direction, passing through a stator core in a direction perpendicular to the axial direction, and passing through a first magnetizing path that connects a portion including said rotation shaft at a side of said first bracket to an outer circumference of said stator core through a yoke positioned outside said assembled body, wherein the magnetizing flux passes through a half of said assembled body in the axial direction; and magnetizing said magnet material of said second rotor unit in the axial direction in a polarity opposite to that of said magnet material of said first rotor unit by a magnetizing flux passing through said second bracket and said second rotor unit in the axial direction, passing through said stator core in a direction perpendicular to the axial direction, and passing through a second magnetizing path that connects the portion including said rotation shaft at a side of said second bracket to the outer circumference of said stator core through a yoke positioned outside said assembled body, wherein the magnetizing flux passes through the remaining half of said assembled body in the axial direction.

2. The manufacturing method of a hybrid permanent magnet type electric rotating machine according to claim 1, wherein said magnet material of said first rotor unit and said magnet material of said second rotor unit are magnetized at the same time by means of a magnetizing device that is provided with both of said first and second magnetizing paths.

3. The manufacturing method of a hybrid permanent magnet type electric rotating machine according to claim 1, wherein said magnet material of said first rotor unit is magnetized by means of a magnetizing device that is provided with one of said first and second magnetizing paths, and then, said magnet material of said second rotor unit is magnetized after said assembled body is removed from said magnetizing device and is reset thereto in a reversed orientation in the axial direction.

4. The manufacturing method of a hybrid permanent magnet type electric rotating machine according to claim 1, wherein an electric conductive member is installed between said first rotor unit and said second rotor unit when said rotor is constructed.

5. A manufacturing method of a hybrid permanent magnet type electric rotating machine, the method comprising:

constructing a stator by winding excitation coils around respective main poles, and by forming a plurality of inductors on a tip portion of each of said main poles;

constructing a rotor by fixing a first rotor unit, which consists of a pair of rotor cores arranged with deviation of ½ a pitch of small teeth formed around said rotor cores in a circumferential direction and a magnet material sandwiched between said rotor cores, and a second rotor unit, which has the same construction as said first rotor unit, to a common rotation shaft so that positions of the small teeth of the adjacent rotor cores of said first and second rotor units are identical;

magnetizing said magnet material of said first rotor unit in an axial direction by a magnetizing flux passing through said magnet material of said first rotor unit in the axial direction, and passing through a first magnetizing path that connects a side surface or a portion including an outer circumference of an outside rotor core of said first rotor unit to the outer circumference of an inside rotor core of said first rotor unit through a yoke positioned outside said rotor;

magnetizing said magnet material of said second rotor unit in the axial direction in a polarity opposite to that of said magnet material of said first rotor unit by a magnetizing flux passing through said magnet material of said second rotor unit in the axial direction, and passing through a second magnetizing path that connects a side surface or a portion including an outer circumference of an outside rotor core of said second rotor unit to an outer circumference of an inside rotor core of said second rotor unit through a yoke positioned outside said rotor; and assembling said rotor to said stator with a predetermined air gap therebetween so that said rotor is free to rotate by means of a first bracket arranged at an outside of said first rotor unit and a second bracket arranged at an outside of said second rotor unit.

6. The manufacturing method of a hybrid permanent magnet type electric rotating machine according to claim 5, wherein said magnet material of said first rotor unit is magnetized by means of a magnetizing device that is provided with one of said first and second magnetizing paths, and then, said magnet material of said second rotor unit is magnetized after said rotor is removed from said magnetizing device and is reset thereto in a reversed orientation in the axial direction.

7. The manufacturing method of a hybrid permanent magnet type electric rotating machine according to claim 5, wherein said magnet material of said first rotor unit and said magnet material of said second rotor unit are magnetized at the same time by means of a magnetizing device that is provided with both of said first and second magnetizing paths.

8. The manufacturing method of a hybrid permanent magnet type electric rotating machine according to claim 5, wherein the step of constructing the rotor comprises installing an electric conductive member between said first rotor unit and said second rotor unit.

* * * * *